United States Patent
Sun et al.

(10) Patent No.: US 12,244,533 B2
(45) Date of Patent: Mar. 4, 2025

(54) METHOD AND APPARATUS FOR UPLINK TRANSMISSION

(71) Applicant: Samsung Electronics Co., Ltd., Suwon-si (KR)

(72) Inventors: Feifei Sun, Beijing (CN); Qi Xiong, Beijing (CN); Yi Wang, Beijing (CN); Sa Zhang, Beijing (CN); Jingxing Fu, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 17/576,469

(22) Filed: Jan. 14, 2022

(65) Prior Publication Data

US 2022/0231815 A1 Jul. 21, 2022

(30) Foreign Application Priority Data

Jan. 15, 2021 (CN) .......................... 202110057409.7
Jan. 18, 2021 (CN) .......................... 202110062981.2

(Continued)

(51) Int. Cl.
*H04L 5/00* (2006.01)

(52) U.S. Cl.
CPC .......... *H04L 5/0053* (2013.01); *H04L 5/0051* (2013.01); *H04L 5/0064* (2013.01)

(58) Field of Classification Search
CPC ..... H04L 5/0044; H04L 1/189; H04L 5/0051; H04L 5/0064; H04L 1/1854;

(Continued)

(56) References Cited

U.S. PATENT DOCUMENTS

2016/0360462 A1* 12/2016 Chockalingam .. H04W 36/0058
2018/0213484 A1*  7/2018 Oh ........................ H04W 52/42

(Continued)

FOREIGN PATENT DOCUMENTS

EP        3697015 A1    8/2020
WO    2020037257 A1    2/2020

(Continued)

OTHER PUBLICATIONS

"3rd Generation Partnership Project; Technical Specification Group Radio Access Network; NR; Physical layer procedures for data (Release 16)", 3GPP TS 38.214 V16.0.0 (Dec. 2019), 147 pages.

(Continued)

*Primary Examiner* — Chi Ho A Lee

(57) ABSTRACT

A method and a corresponding apparatus for performing uplink transmission in a wireless communication system are disclosed. The method comprises: based on at least one of the information indicating uplink transmission resources, acquiring the number of resource elements REs used for determining a PUSCH transmission; determining a transport block size TBS for the uplink transmission based on the number of REs; and performing the uplink transmission based on the determined TBS. Wherein, a PUSCH transmission occupies m time unit for transmission, and the rate matching and RE mapping of the PUSCH are performed on all resources occupied in m time unit.

12 Claims, 18 Drawing Sheets

(30) Foreign Application Priority Data

| Apr. 2, 2021 | (CN) | 202110362151.1 |
| Apr. 2, 2021 | (CN) | 202110363503.5 |
| Jul. 28, 2021 | (CN) | 202110856804.1 |

(58) Field of Classification Search
CPC ... H04L 1/1858; H04L 5/0053; H04L 1/1864; H04L 1/1861; H04L 5/0091
See application file for complete search history.

(56) References Cited

U.S. PATENT DOCUMENTS

| | | | |
|---|---|---|---|
| 2020/0052827 | A1 | 2/2020 | Vilaipornsawai et al. |
| 2020/0367208 | A1 | 11/2020 | Khoshnevisan et al. |
| 2021/0014095 | A1 | 1/2021 | Ly et al. |
| 2021/0051690 | A1* | 2/2021 | He ................. H04L 1/1822 |
| 2021/0250887 | A1* | 8/2021 | Xiong .............. H04W 48/20 |
| 2022/0046666 | A1* | 2/2022 | Takeda ........... H04W 72/1268 |
| 2022/0086873 | A1* | 3/2022 | Wong .................. H04L 1/08 |
| 2022/0210806 | A1* | 6/2022 | Rastegardoost ...... H04L 5/0051 |
| 2022/0225388 | A1* | 7/2022 | You .................. H04W 72/23 |
| 2022/0361206 | A1* | 11/2022 | Jiang ............... H04W 72/21 |
| 2022/0386243 | A1* | 12/2022 | Liang .............. H04W 52/226 |
| 2023/0155746 | A1* | 5/2023 | Ouchi .............. H04W 72/232 370/329 |
| 2023/0291523 | A1* | 9/2023 | Hasegawa ......... H04L 5/0094 |
| 2023/0345471 | A1* | 10/2023 | Seok ................ H04L 5/0094 |
| 2023/0421327 | A1* | 12/2023 | Ly .................. H04W 72/1268 |

FOREIGN PATENT DOCUMENTS

| WO | 2020164102 A1 | 8/2020 |
| WO | 2020226391 A1 | 11/2020 |

OTHER PUBLICATIONS

"3rd Generation Partnership Project; Technical Specification Group Radio Access Network; NR; Physical layer procedures for control (Release 16)", 3GPP TS 38.213 V16.0.0 (Dec. 2019), 146 pages.

International Search Report and Written Opinion of the International Searching Authority dated May 2, 2022, in connection with International Application No. PCT/KR2022/000695, 7 pages.

Wilus Inc., "Discussion on potential techniques for PUSCH coverage enhancement," R1-2008729, 3GPP TSG RAN WG1 Meeting #103-e, Oct. 26-Nov. 13, 2020, 6 pages.

Supplementary European Search Report dated Oct. 17, 2024, in connection with European Patent Application No. 22739742.9, 11 pages.

Huawei, "Feature lead summary of HARQ enhancements for NR-U," R1-1909496, 3GPP TSG RAN WG1 Meeting #98, Prague, Czech Republic, Aug. 26-30, 2019, 29 pages.

Moderator (Nokia, Nokia Shanghai Bell), "FL summary of TB processing over multi-slot PUSCH (AI 8.8.1.2)," R1-2110248, 3GPP TSG RAN WG1 #106bis-e, e-Meeting, Oct. 11-19, 2021, 59 pages.

* cited by examiner

METHOD AND APPARATUS FOR UPLINK TRANSMISSION

CROSS-REFERENCE TO RELATED APPLICATIONS

This application is based on and claims priority under 35 U.S.C. § 119(a) to Chinese Patent Application No. 202110057409.7 filed on Jan. 15, 2021, Chinese Patent Application No. 202110062981.2 filed on Jan. 18, 2021, Chinese Patent Application No. 202110362151.1 filed on Apr. 2, 2021, Chinese Patent Application No. 202110363503.5 filed on Apr. 2, 2021, and Chinese Patent Application No. 202110856804.1 filed on Jul. 28, 2021, in the Chinese Intellectual Property Office, the disclosures of which are herein incorporated by reference in their entirety.

BACKGROUND

1. Field

The present application relates to an uplink channel transmission method and apparatus thereof in wireless communication, and more particularly, to a method and apparatus for uplink transmission in wireless communication.

2. Description of Related Art

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

SUMMARY

On the basis of the repetition transmission mode supported by the existing wireless communication system, there are some problems of the inability to select an appropriate transport block size (TBS) and how to multiplex the physical uplink control information (UCI) on the physical uplink shared channel (PUSCH).

Technical Solution

The present disclosure provides a method and apparatus for uplink transmission.

Particularly, the present disclosure provides a method performed by a user equipment (UE) in a wireless communication system, which comprises: acquiring the number of resource elements REs used to determine a PUSCH transmission based on at least one of the information indicating uplink transmission resources; determining a transport block size TBS for the uplink transmission based on the number of REs; and performing the uplink transmission based on the determined TBS; wherein, the PUSCH transmission occupies m time unit for transmission, and the rate matching and RE mapping of the PUSCH transmission are performed on all resources occupied in m time unit. Wherein, multiple PUSCH transmission may include the same transport block (TB) or different TBs.

In an embodiment, the information of uplink transmission resources includes: the number of time domain symbols L, the number of time unit m, the number of symbols or REs occupied by demodulation reference signal DMRS in the m time unit occupied by the PUSCH transmission, and an overhead configured by a higher layer.

In an embodiment, a time unit is configured or defined as one of the followings: one or more slots, one or more symbols, one or more nominal repetitions, and one or more actual repetitions.

In an embodiment, the number of time unit m is obtained by at least one of the followings: obtaining the number of time unit m through a dedicated field used for indicating the number of time unit m in downlink control information DCI; obtaining the number of time unit m through an indication of the number of time unit m indicated in the time domain resource allocation TDRA table; and obtaining the number of time unit m via RRC configuration signaling.

In an embodiment, performing uplink transmission based on the determined TBS further comprises: acquiring the number of repetitions of the PUSCH transmission rep; obtaining the number of time domain resources and/or time domain resource allocation of the uplink transmission based on the number of repetitions of the PUSCH transmission rep and the number of time unit m occupied by the PUSCH transmission; and performing the uplink transmission based on the determined TBS and the number of time domain resources and/or time domain resource allocation of the uplink transmission.

In an embodiment, the time domain position of DMRS in m time unit of one or more PUSCH transmission and/or the number of symbols or REs occupied by DMRS in one or more PUSCH transmission are obtained.

In an embodiment, acquiring time domain position of DMRS in m time unit occupied by one or more PUSCH transmission, and/or the number of symbols or REs occupied by DMRS in one or more PUSCH transmission based on at least one of the followings: the starting symbol position of time unit, the number of symbols of time unit, the position of the first symbol belonging to the same PUSCH transmission in time unit, the number of symbols belonging to the same PUSCH transmission in time unit, the position of the first symbol of all PUSCH transmission carrying the same TB in time unit, the number of all symbols of all PUSCH transmission carrying the same TB in time unit, the position of the first symbol of all PUSCH transmission carrying multiple TBs in time unit, the number of all symbols of all PUSCH transmission carrying multiple TBs in time unit.

In an embodiment, power control for uplink transmission is performed with a unit of one of the followings: all symbols of one or more PUSCH transmission, one or more time units for determining a TBS, one or more time units for determining DMRS position, one or more time units keeping phase unchanged, and one or more transport resource blocks.

In an embodiment, it is determined whether all or part of uplink transmission is canceled or postponed with a unit of one of the followings: all symbols of one or more PUSCH transmission, time unit for determining a TBS, one or more time units for determining frequency domain position of DMRS, and one or more time units keeping phase unchanged.

In an embodiment, the cancellation or postpone of all or part of uplink transmission is indicated by a slot indication format SFI or an uplink cancellation indication UL CI.

In an embodiment, determining a transport block size TBS for uplink transmission based on the number of REs comprising: determining the transport block size TBS for the uplink transmission according to an equivalent code rate and/or a first modulation order indicated or predefined by a base station along with the number of REs; wherein the equivalent code rate is obtained according to at least one of the first modulation order, a second modulation order indicated by a modulation and coding scheme MCS field in DCI, the code rate indicated by the modulation and coding scheme MCS field in DCI, and the number of time unit m occupied by a TB.

In an embodiment, the number of uplink transmission time domain resources does not exceed a predetermined value.

The present disclosure also provides a method performed by a base station in a wireless communication system, which comprises: transmitting information indicating uplink transmission resources to a UE, wherein at least one of the information indicating uplink transmission resources is used for the UE to determine the number of resource elements REs of a physical uplink shared channel PUSCH transmission and a transport block size TBS; receiving the uplink transmission based on the TBS; wherein the PUSCH transmission occupies m time unit for transmission, and the rate matching and RE mapping of the PUSCH transmission are performed on all resources occupied in m time unit.

In addition, the present disclosure also provides a method performed by a user equipment UE in a wireless communication system, which comprises: determining position of time unit of a physical uplink shared channel PUSCH multiplexed with physical uplink control information UCI according to predefined multiplexing rules, wherein the PUSCH occupies one or more time units; determining the symbol position for UCI multiplexing in the PUSCH; determine the number of resource elements REs occupied by UCI; and mapping UCI on the resources of the PUSCH according to one or more of the followings: the position of time unit, the symbol position and the number of REs, and transmitting the PUSCH multiplexed with UCI.

In an embodiment, determining the symbol position for UCI multiplexing in a PUSCH includes determining the symbol position for UCI multiplexing in the PUSCH according to at least one of the followings: UCI information type, UCI coding and mapping scheme, demodulation reference signal DMRS position in PUSCH, one or more time units carrying multiplexed UCI, and all time units occupied by the PUSCH.

In an embodiment, the method for determining the number of resource elements REs occupied by UCI includes: determining the number of resource elements REs occupied by UCI according to at least one of the followings: the number of resource elements REs in all time units occupied by the PUSCH multiplexed with UCI, the number of resource elements REs of one or more time units for UCI multiplexing, the number of time unit used for UCI multiplexing in one or more time units occupied by the PUSCH, the number of one or more time units occupied by the PUSCH multiplexed with UCI, and a code rate conversion coefficient.

In an embodiment, before determining the position of time unit for a PUSCH multiplexed with UCI, further comprises: deciding whether to multiplex UCI in the PUSCH according to predefined timing requirement(s).

In an embodiment, deciding whether to multiplex UCI in a PUSCH according to predefined timing requirement(s) further comprises: when UCI cannot be multiplexed in the PUSCH, one of the following operations is performed: drop all or part of the PUSCH transmission on the time unit overlapped with a physical uplink control channel PUCCH transmitting UCI; or drop the PUSCH transmission on all time unit of the PUSCH overlapped with the PUCCH transmitting UCI; or delay all or part of the PUSCH transmission on the time unit overlapped with the PUCCH transmitting UCI; or delay the PUSCH transmission on all time unit of the PUSCH overlapped with the PUCCH transmitting UCI.

In an embodiment, deciding whether to multiplex UCI in a PUSCH according to predefined timing requirement(s) comprises: determining to multiplex UCI in the PUSCH when predefined condition(s) are met, wherein the predefined condition(s) includes one or more of the followings: among the overlapped time unit between PUCCH and PUSCH, the time interval from the first symbol of a PUSCH overlapped with a PUCCH to the last symbol of a PDSCH scheduled by downlink control information DCI corresponding to the HARQ-ACK, is greater than a first numerical value; among the PUCCH and PUSCH overlapping in time domain, there is at least one PUSCH overlapped with a PUCCH, which satisfies that the time interval from the earliest transmitted symbol of the PUSCH in one or more time units occupied by the PUSCH to the last symbol of a PDSCH scheduled by DCI corresponding to the HARQ-ACK, is greater than the first numerical value; among the PUCCH and PUSCH overlapping in time domain, the time interval from the earliest transmitted symbol of a PUSCH in one or more time units occupied by the PUSCH to the last symbol of a PDSCH scheduled by DCI cooresponding to the HARQ-ACK is greater than the first numerical value; among the time unit where a PUCCH a PUSCH overlaps in time domain, the time interval from the first symbol of the PUSCH overlapped with the PUCCH to the last symbol of the latest DCI is greater than a second numerical value, where the DCI is DCI scheduling a PUSCH or DCI scheduling a PUCCH; among the PUCCH and PUSCH overlapping in time domain, there is at least one PUSCH overlapped with a PUCCH, which satisfies that the time interval from the earliest transmitted symbol of the PUSCH in one or more time units occupied by the PUSCH to the last symbol of the latest DCI , is greater than the second numerical value, where the DCI is DCI scheduling a PUSCH or DCI scheduling a PUCCH; among the PUCCH and PUSCH overlapping in time domain, the time interval from the earliest transmitted symbol of the PUSCH in one or more time units occupied by the PUSCH to the last symbol the latest DCI is greater than the second numerical value, where the DCI is DCI scheduling a PUSCH or DCI scheduling a PUCCH.

In an embodiment, determining the time unit position of a PUSCH multiplexed with UCI according to predefined multiplexing rules, comprises at least one of the followings: determining each time unit in at least one time unit where UCI overlaps with the PUSCH as the time unit position for UCI multiplexing in the PUSCH; determining the first time unit in at least one time unit where UCI overlaps with the PUSCH as the time unit position for UCI multiplexing in the PUSCH; determining the first time unit among multiple time units where UCI overlaps with the PUSCH which meets the timing condition as the time unit position for UCI multiplexing in the PUSCH.

In an embodiment, the time unit for UCI multiplexing in the PUSCH includes at least one DMRS symbol.

In an embodiment, determining the symbol position for UCI multiplexing in a PUSCH comprises at least one of the followings: determining the first symbol position for a PUSCH transmission or the first non-DMRS symbol position for the PUSCH transmission in the overlapped time unit between PUCCH and PUSCH as the starting symbol position for UCI mapping; determining the first symbol position for a PUSCH transmission or the first non-DMRS symbol position for the PUSCH transmission in one or more time units occupied by the PUSCH overlapped with a PUCCH as the starting symbol position for UCI mapping; determining the symbol position of the first DMRS or the symbol position after the first DMRS symbol in one or more time units occupied by a PUSCH overlapped with a PUCCH as the starting symbol position for UCI mapping; determining the starting or ending symbol position of the PUCCH transmission indicated in one or more time units occupied by a PUSCH overlapped with the PUCCH, the closest DMRS symbol position in one or more time units occupied by the PUSCH overlapped with the PUCCH or the symbol position after the DMRS symbol as the starting symbol position for UCI mapping; determining the first symbol position or the first non-DMRS symbol position occupied by a PUSCH in the first time unit after the overlapped time unit between PUCCH and PUSCH as the starting symbol position for UCI mapping; determining the first symbol position or the first non-DMRS symbol position occupied by a PUSCH in the first time unit including a DMRS after the overlapped time unit between PUCCH and PUSCH as the starting symbol position for UCI mapping.

In an embodiment, mapping UCI on PUSCH resources according to one or more of time unit positions, a symbol position and the number of REs comprises: performing PUSCH rate matching according to the number REs occupied by UCI and mapping according to the time unit position and the symbol position; or puncturing the PUSCH according to the number of REs occupied by UCI and mapping according to the time unit position and the symbol position.

The method also provides a method performed by a base station in a wireless communication system, the method comprises: scheduling a physical uplink control channel PUCCH carrying uplink information UCI and a physical uplink shared channel PUSCH overlapped with the PUCCH according to predefined multiplexing rule(s); and receiving the PUSCH transmission, wherein the UCI is multiplexed on the PUSCH according to the predefined multiplexing rule(s).

The present disclosure also provides a user equipment (UE) and a base station including a memory and a processor, wherein the processor performs a method for uplink transmission in a wireless communication system.

Advantageous Effects of the Present Disclosure

When a PUSCH transmission occupies m time unit for transmission, and the PUSCH is rate matched and RE mapped on all resources occupied in the m time unit, the present disclosure can realize the selection of the appropriate transport block size (TBS) in a more flexible way on the basis of the repetition transmission mode supported by the existing NR system, when determining the TBS for the uplink transmission. In addition, the method provided in this disclosure can balance the uplink control information (UCI) and the performance of the uplink data channel, improving uplink throughput and reduce the transmission delay of uplink control information (UCI).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
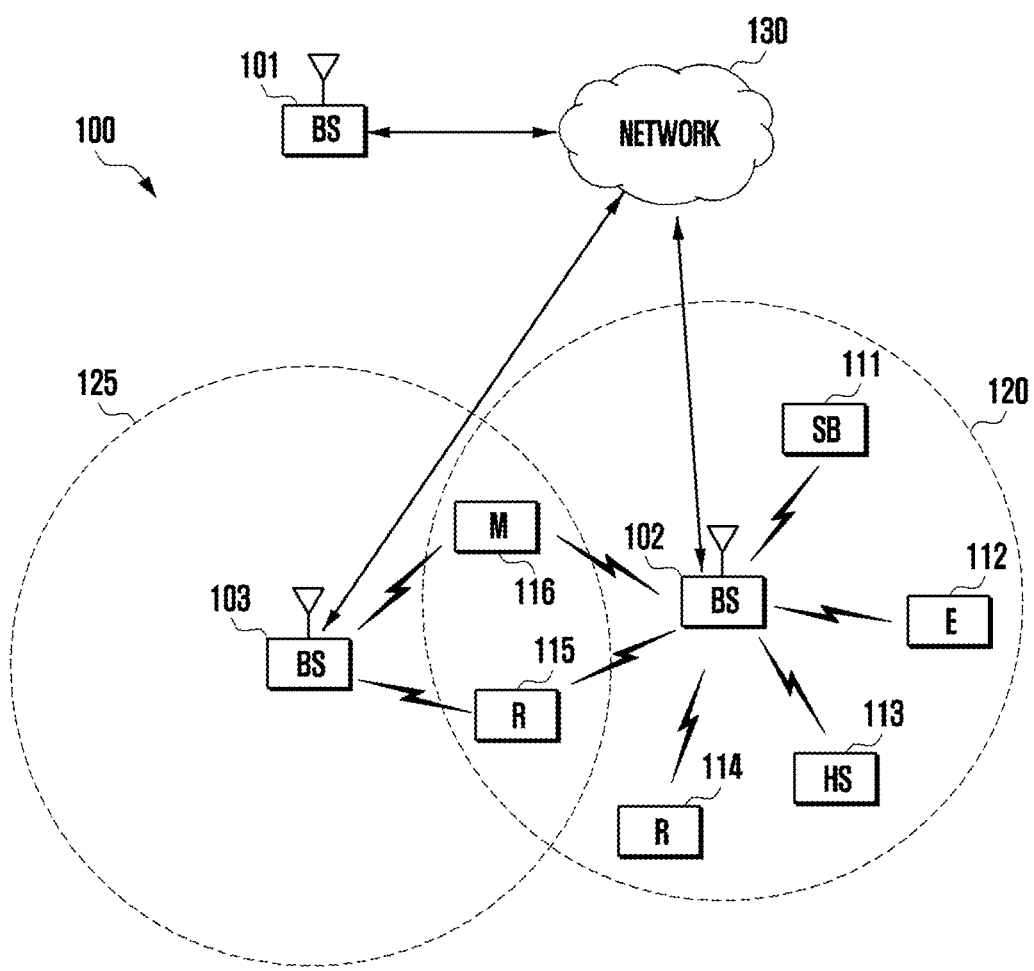
FIG. 1 illustrates an overall structure of an example wireless communication network according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure will be described below with reference to the accompanying drawings. It should be noted that in the drawings, the same or similar elements are denoted by the same or similar reference numerals as much as possible. Furthermore, detailed descriptions of known functions or configurations that may obscure the subject matter of the present disclosure will be omitted.

When describing embodiments of the present disclosure, descriptions related to technical contents known in the art and not directly related to the present disclosure will be omitted. In this way, unnecessary descriptions are omitted in order to prevent the main idea of the disclosure from being blurred and to convey the main idea more clearly.

For the same reason, some elements may be enlarged, omitted or schematically shown in the drawings. In addition, the size of each component does not fully reflect the actual size. In the drawings, identical or corresponding elements have the same reference numerals.

Advantages and features of the present disclosure and the manner of realizing them will become clear by referring to the embodiments described in detail below in conjunction with the accompanying drawings. However, the present disclosure is not limited to the embodiments set forth below, but may be implemented in various different forms. The following examples are provided only to fully disclose the disclosure and inform those skilled in the art of the scope of the disclosure, and the disclosure is only limited by the scope of the appended claims. Throughout the specification, the same or similar reference numerals refer to the same or similar elements.

In wireless communication systems, due to the limited uplink transmission power, uplink coverage is usually the bottleneck of the system coverage. In order to increase uplink coverage, it can be done by reducing the code rate. A method and apparatus for transmitting a data channel with a low bit rate will be described in detail with reference to embodiments.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. The gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of User Equipments (UEs) within a coverage area 120 of the gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. The gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102 and/or 103 can provide access to other or additional external networks, such as external telephone networks or other types of data networks.

Figure 2A:
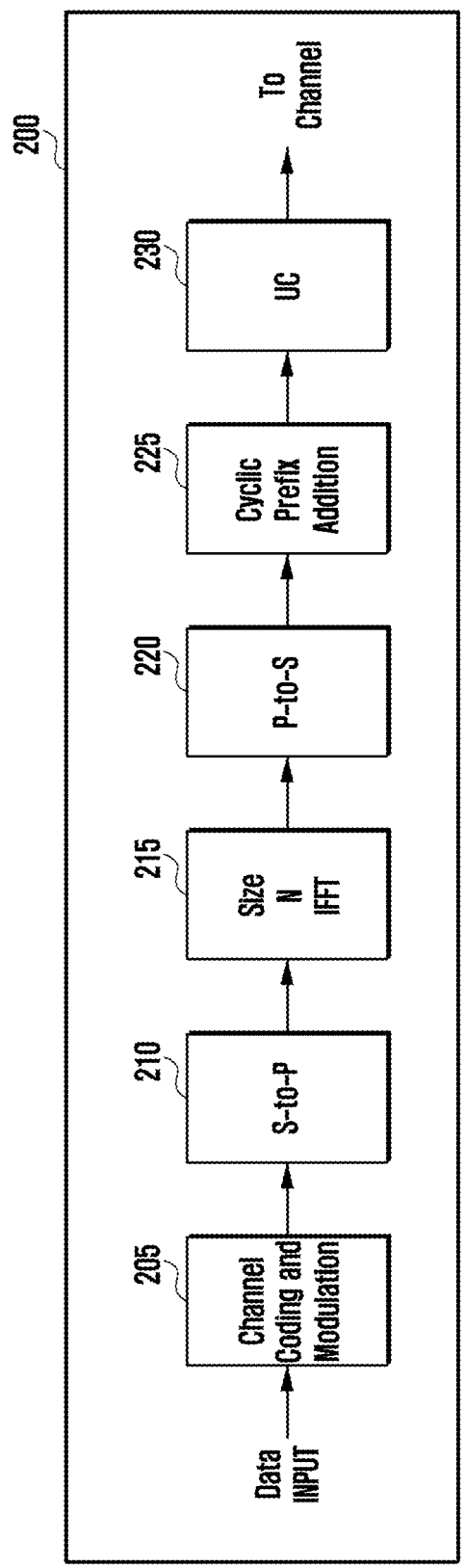
FIG. 2A illustrates a transmission path 200 and a reception path 250 in a wireless communication network according to various embodiments of the present disclosure.
Figure 2B:
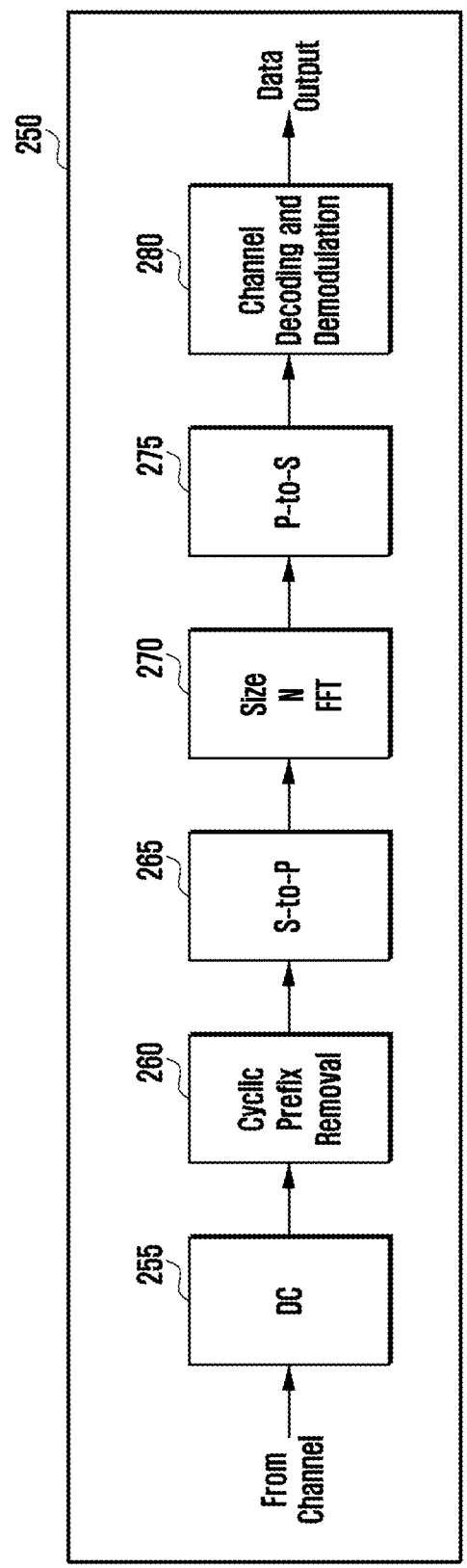
FIG. 2B illustrates a transmission path 200 and a reception path 250 in a wireless communication network according to various embodiments of the present disclosure.

FIGS. 2A and 2B illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols.

The serial-to-parallel (S-to-P) block 210 converts (such as demultiplexes) serial modulated symbols into parallel data to generate N parallel symbol streams, where N is a size of the IFFT/FFT used in the gNB 102 and UE 116. The size N IFFT block 215 performs IFFT operations on the N parallel symbol streams to generate a time-domain output signal. The parallel-to-serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to the gNBs 101-103 in the uplink, and may implement a reception path 250 for receiving from the gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirement(s). Furthermore, FIGS. 2A and 2B are intended to illustrate examples of types of transmission and reception paths that can be used in a wireless network. Any other suitable architecture can be used to support wireless communication in a wireless network.

Figure 3A:
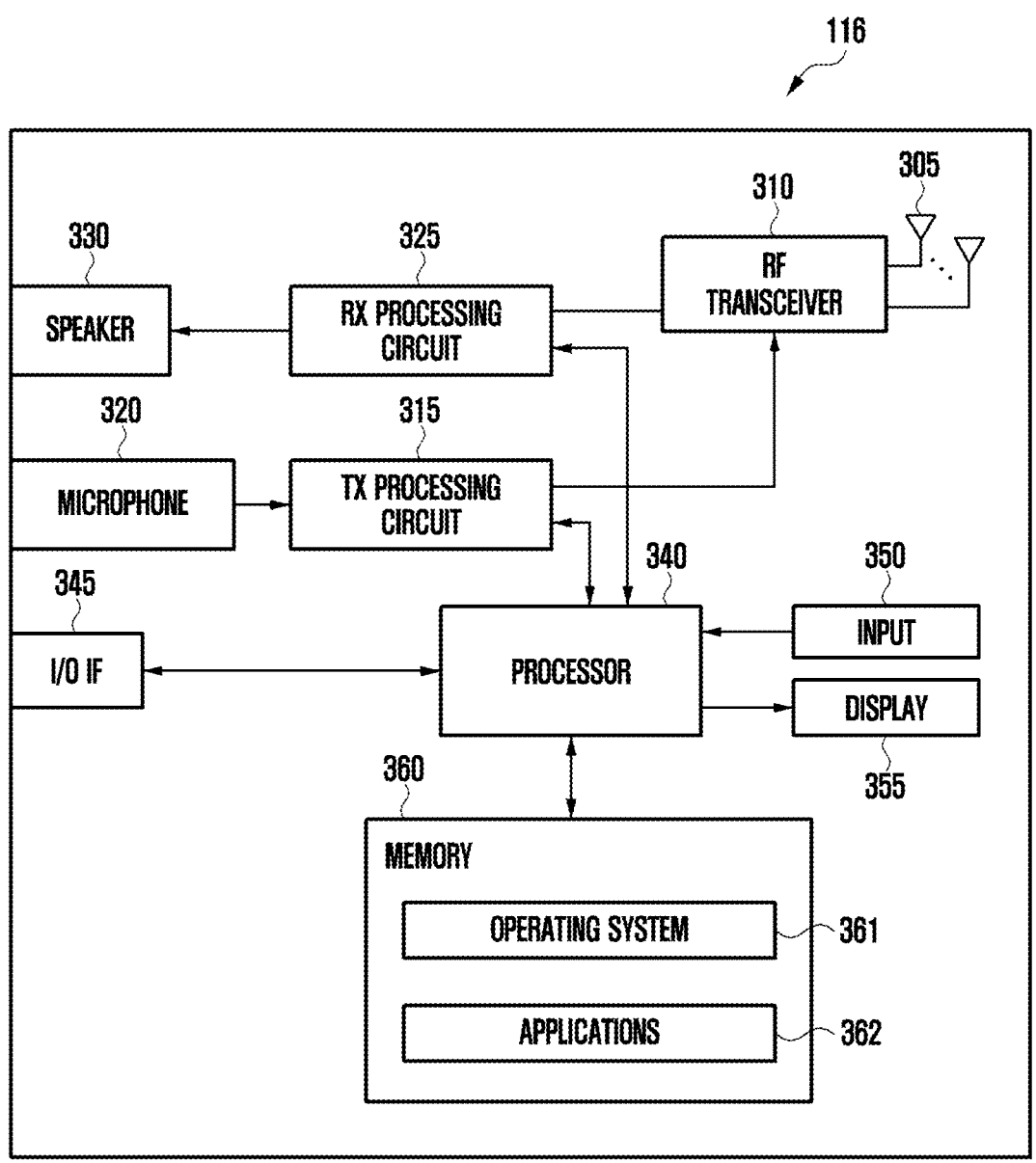
FIG. 3A illustrates the structures of a user equipment (UE) and a base station in a wireless communication network according to various embodiments of the present disclosure.

FIG. 3A illustrates an example UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

The UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirement(s). As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
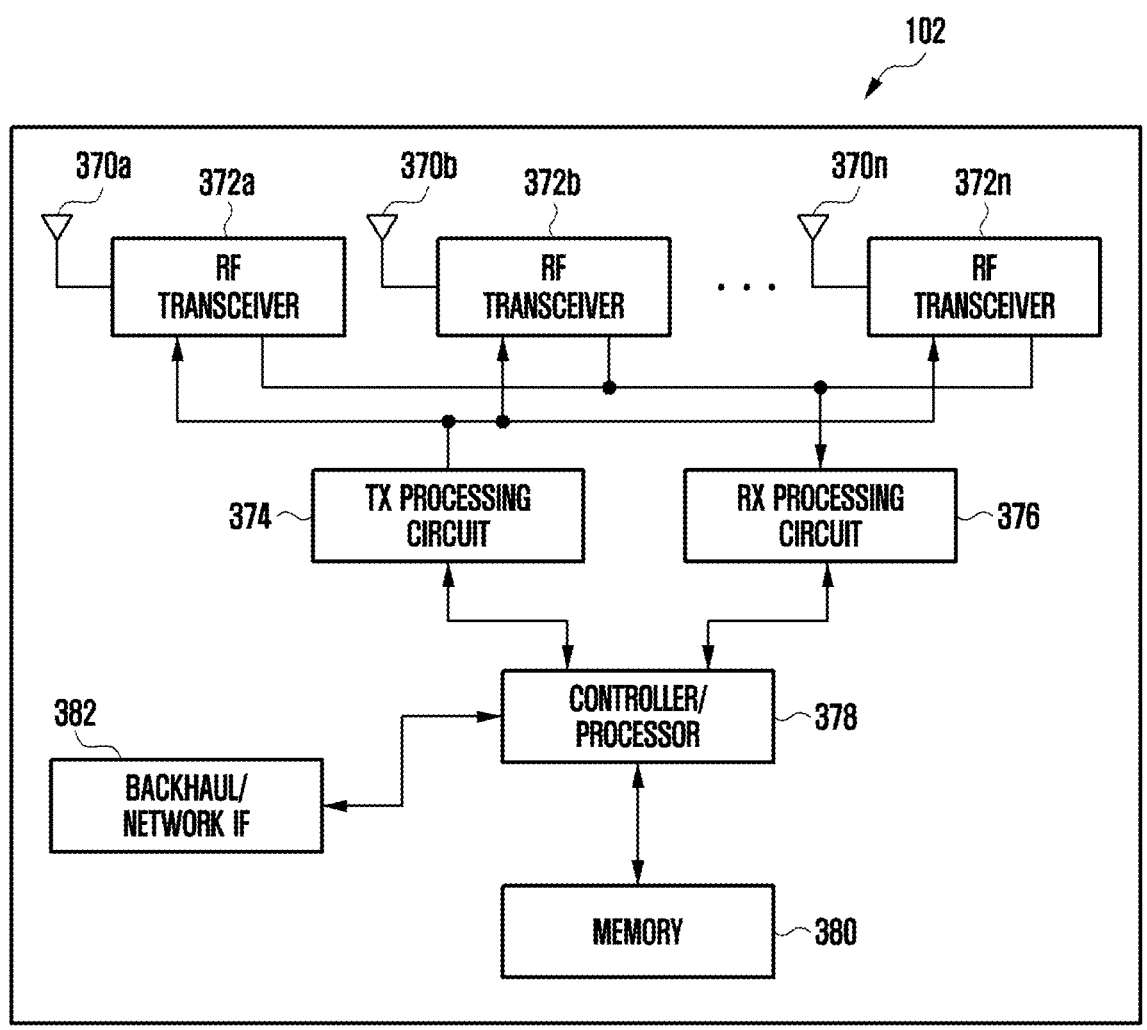
FIG. 3B illustrates the structures of a user equipment (UE) and a base station in a wireless communication network according to various embodiments of the present disclosure.

FIG. 3B illustrates an example gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that a gNB 101 and a gNB 103 can include the same or similar structures as the gNB 102.

As shown in FIG. 3B, the gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of the gNB 102 (implemented using RF transceivers 372a-372n, TX processing circuit 374 and/or RX processing circuit 376) support aggregated communication with FDD cells and TDD cells.

Although FIG. 3B illustrates an example of the gNB 102, various changes may be made to FIG. 3B. For example, the gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

Figure 4:
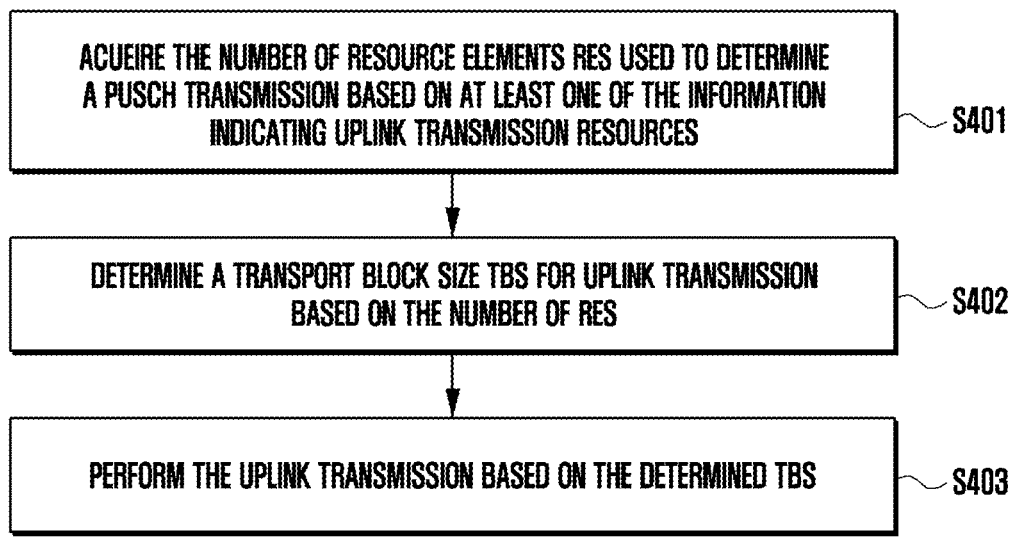
FIG. 4 is a flowchart illustrating a method of a user equipment for uplink transmission in a wireless communication system according to various embodiments of the present disclosure.

FIG. 4 is a flowchart illustrating a method of a user equipment (UE) for uplink transmission in a wireless communication system according to various embodiments of the present disclosure.

Referring to FIG. 4, at S401, a UE acquires the number of resource elements REs used to determine a PUSCH transmission based on at least one of information indicating uplink transmission resources. Wherein, the PUSCH transmission occupying m time unit includes the PUSCH transmission occupying all or part of the symbols in the m time unit. Wherein, the number of REs of the PUSCH transmission may be the number of REs occupied by an actual PUSCH transmission. Alternatively, the PUSCH transmission is a virtual PUSCH transmission, which does not actually occur, and it is merely used to calculate a TBS. In addition, the PUSCH transmission can also be called one PUSCH repetition.

Preferably, the information of uplink transmission resources includes the number of time domain symbols L, the number of time unit m, the numbers of symbols or REs occupied by a demodulation reference signal DMRS in m time unit occupied by one PUSCH, and an overhead configured by the higher layer.

Preferably, the number of time domain symbols L is indicated by a field indicating time domain resource allocation in DCI, for example, the number of time domain symbols L indicated in a time domain resource allocation (TDRA) table. Alternatively, the number of time domain symbols L is the number of symbols in one time unit. Preferably, the number of time domain symbols L is the number of time domain symbols in one time unit.

Preferably, the time unit can be configured or defined as one of the followings: one or more slots, one or more symbols, one or more nominal repetitions, and one or more actual repetitions. In addition to be used for determining the number of REs of one TB, the time unit can also be unit for determining the time domain position of DMRS, or unit for canceling or postponeing channel transmission. Preferably, one time unit is one slot. Wherein, the number of time domain symbols in different time units may be the same or different, for example, the number of symbols occupied by each actual repetition may be different. In addition, one PUSCH transmission occupying one time unit indicates occupying all or part of symbols in the time unit.

The number of time unit m can be obtained by at least one of the following ways: obtaining the number of time unit m by a dedicated field for indicating the number of time unit m in downlink control information DCI; obtaining the number of time unit m according to the indication of the number of time unit m indicated in the time domain resource allocation TDRA table; and obtaining the number of time unit m via RRC configuration signaling. In an example, the number of time unit m can be the number of repetitions of a TB repeated in Type A or Type B PUSCH mode. The number of time unit m may also be different from the number of repetitions of a TB.

Preferably, the UE can obtain the number of time domain resource and/or time domain resource allocation for uplink transmission based on the number of repetitions rep of a PUSCH transmission and the number of time unit m occupied by a TB. In order to improve spectrum utilization, the number of time domain resources for uplink transmission does not exceed a predetermined value. The predetermined value can be configured by a base station or be a predefined value. Wherein, the number of time domain resources for uplink transmission can be with a unit of the number of time unit, symbols, or other time domain resource unit. In addition, the UE can also calculate and obtain the number of time domain resources for uplink transmission according to other parameters. For example, the maximum number of repetitions of one PUSCH is 16, that is, occupying up to 16 slots (14×16=224 symbols). Then, the number of time domain resources for uplink transmission does not exceed 16 slots, or does not exceed 224 symbols.

At S402, the UE determines a transport block size TBS for uplink transmission based on the number of REs. Wherein, determining the transport block size TBS for uplink transmission based on the number of REs comprising: the UE determines the transport block size TBS for uplink transmission according to an equivalent code rate and/or a first modulation order indicated by a base station or predefined, as well as the number of REs. Wherein, the equivalent code rate is obtained according to at least one of the first modulation order, a second modulation order indicated by a modulation and coding scheme MCS field in DCI, the code rate indicated by the modulation and coding scheme MCS field in DCI, and the number of time unit m occupied by a TB.

At S403, the UE performs uplink transmission based on the determined TBS. Preferably, one PUSCH transmission occupies m time unit for transmission, and the rate matching and RE mapping of the PUSCH transmission are performed on all resources occupied in the m time unit. Preferably, the UE repeats rep times by way of performing one transmission every m time unit.

The method also includes (S404, not shown in FIG. 4) that the UE acquires the time domain position of DMRS in m time unit of one PUSCH transmission. Particularly, UE can determine the time domain position of DMRS based on at least one of the starting symbol position of time unit, the number of symbols of time unit, the position of the first symbol belonging to the same PUSCH transmission in time unit, the number of symbols belonging to the same PUSCH transmission in time unit, the position of the first symbol of all PUSCH transmission carrying the same TB in time unit, the number of all symbols of all PUSCH transmission carrying the same TB in time unit, the position of the first symbol of all PUSCH transmission carrying multiple TBs in time unit, the number of all symbols of all PUSCH transmission carrying multiple TBs in time unit and one or more transport resource blocks. Wherein, one transport resource block can be composed of several continuous symbols. Similarly, the UE can obtain the number of symbols or REs occupied by DMRS in one or more PUSCH transmission according to one or more of the above information.

The method also includes (S405, not shown in FIG. 4) that the UE performs power control for uplink transmission with a unit of one of the followings: all symbols of one or more PUSCH transmission, one or more time units for determining the TBS, one or more time units for determining the DMRS position, and one or more time units keeping the phase unchanged. Wherein, the number of one or more time units keeping the phase unchanged can be obtained through the configuration of a base station.

The method also includes (S406, not shown in FIG. 4) that the UE determines whether to cancel or postpone all or part of the uplink transmission with a unit of one of the followings: all symbols of one or more PUSCH transmission, one or more time units for determining the TBS, one or more time units for determining the DMRS position, and one or more time units keeping the phase unchanged. Wherein, the cancellation or postponement of all or part of the uplink transmission is indicated by a slot indication format SFI or an uplink cancellation indication UL CI. Wherein, the number of one or more time units for determining whether to cancel or postpone all or part of the uplink transmission can be obtained through a base station configuration.

The method can also be applied to the transmission of other links, such as a PUCCH, a PSSCH in sidelink system, etc. Similar methods can be applied to the reception of downlink channels, such as a PDSCH and a PDCCH.

In the current NR system, a base station configures a time domain resource allocation TDRA table through RRC signaling, and further indicates to the UE a serial number in the TDRA table (a row in the TDRA table), the serial number corresponds to the slot position K of the first repetition, the starting symbol position S in the slot and the number of symbols of one PUSCH transmission. In Rel-16, the TDRA table may also include the number of repetitions (rep). In addition, the number of repetitions can be configured through RRC.

In the current NR system, PUSCH supports two repetition transmission methods as shown below:
(1) Type A repetition transmission method: each repetition occupies the same symbol position in different slots. Each repetition may be discontinuous; and
(2) Type B repetition transmission method: each nominal repetition is continuous, but the position of the actual transmission may cut the unavailable subframe or slot boundary to produce one or more actual repetitions. Wherein, the number of symbols occupied by the nominal repetition is determined according to the number of occupied symbols L in TDRA.

In order to reduce the gain of making full use of channel coding, one transport block can be transmitted on as much time as possible. In addition, the SINR of the receiving end can be improved by concentrating the energy on the limited bandwidth to provide demodulation performance. In NR system, several symbols in time are defined as a slot for time resource allocation. For a large TBS, due to limited frequency domain resources, it is necessary to extend the transmission of one PUSCH to multiple slots for transmission.

Next, the repetition transmission method supporting the expansion of one PUSCH transmission to multiple time units will be discussed in combination with specific embodiments, as described in detail below with reference to FIG. 4.

In the current NR system, the transport block size TBS of a data channel is determined by the following method, and generally, one repetition occupies no more than 14 symbols of time domain resources. At first, the UE determines the number of resource elements REs $N'_{RE}=N_{sc}^{RB} \cdot N_{symb}^{sh} - N_{DMRS}^{PRB} - N_{oh}^{PRB}$ allocated to a PUSCH or a PDSCH in one PRB, where $N_{sc}^{RB}=12$ is the number of frequency domain subcarriers of one PRB, $N_{symb}^{sh}$ is the number of symbols (i.e., L) occupied by one transmission (repetition) indicated in the time domain resource allocation, $N_{DMRS}^{PRB}$ is the number of DMRS in each PRB, and $N_{oh}^{PRB}$ is the number configured by the higher layer. For MSG3 transmission, the overhead is 0. For Type B PUSCH repetition transmission, $N_{DMRS}^{PRB}$ is the symbol length L of a nominal repetition without segmentation. This can be a virtual PUSCH transmission.

The UE determines the total number of allocated REs $N_{RE}=\min(156,N'_{RE}) \cdot n_{PRB}$, where $n_{PRB}$ is the total number of PRBs allocated to the UE. Wherein, 156 is the maximum number of symbols of one PRB determined according to 14 symbols.

Then, a UE obtains a non-quantized intermediate variable ($N_{info}$) according to $N_{info}=N_{RE} \cdot R \cdot Q_m \cdot \upsilon$. Wherein, R is the code rate, Qm is the modulation order, and v is the number of MIMO layers. Then, according to the predefined rules, the non-quantized intermediate variable ($N_{info}$) is quantized to obtain the transport block size (TBS) of a PDSCH or a PUSCH, wherein the predefined rules can be found in the standard TS 38.214 6.1.4.

The UE performs coding, modulation and rate matching, etc., according to the obtained transport block size (TBS), the RE resource position of the actual transmission, modulation scheme, and the number of MIMO layers, etc. And the RE-mapping of the modulated data is performed according to the predefined rules. For the case where one PUSCH transmission occupies multiple time units (one time unit can be defined or configured as one slot or several slots, one or several symbols, nominal repetition block(s), or actual repetition block(s)), rate matching can be performed based on the total occupied of the number of REs in a plurality of time units. That is, one time unit may only include a part of information bits of one TB.

For the case where one repetition of a transport block occupies multiple time units, TBS can be determined by one of the following two methods.

In one embodiment of Method 1, the TBS is determined according to the number of REs used for determining a TBS determined based on the number of time domain symbols L indicated by a base station, as well as the code rate adjusted based on the number of time unit or the coefficient related to the number of time unit.

Particularly, in order to realize the transmission of one PUSCH on m time unit, the target code rate R summarized in the modulation coding scheme (MCS) table can be adjusted with reference to table 1 below. Specifically, the target code rate adjustment used in the calculation in $N_{info}=N_{RE} \cdot R' \cdot Q_m \cdot \upsilon$ is R'=R×m, where R is the corresponding code rate in the MCS table indicated by MSC serial number (Imes), and m is the number of multiple time units spanned by one PUSCH transmission, or a coefficient related to the number of time unit. For example, m may be the number of time unit of an actual PUSCH transmission, or a predefined or configured coefficient. In addition, m may also be a coefficient configured by a base station for determining a TBS. This method can be based on the current Type A or Type B repetition transmission method, without modifying the method for determining the number of REs, and realize the selection of an appropriate TBS by adjusting the target code rate, which is more flexible. In addition, method 1 can also deal with the difference in the number of symbols in each actual repetition caused by segmentation in actual transmission distinctively.

Figure 5:
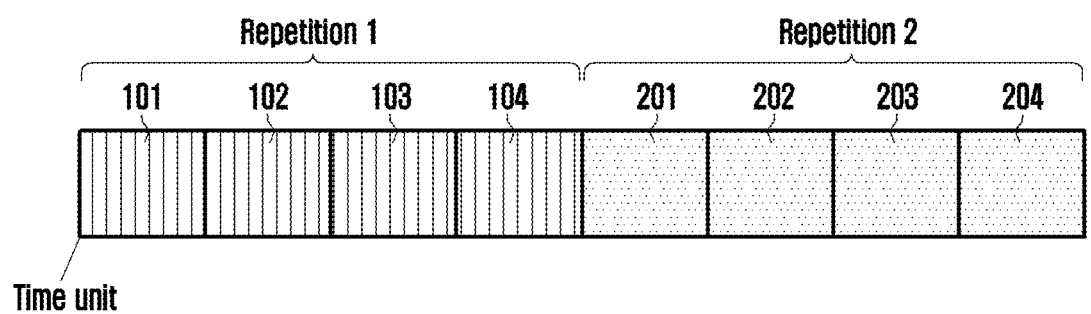
FIG. 5 is a schematic diagram illustrating time domain resource allocation indication according to various embodiments of the present disclosure.

FIG. 5 illustrates a schematic diagram of time domain resource allocation indication. Referring to FIG. 5, repetition 1 occupies 4 time units 101 to 104, and repetition 2 occupies 4 time units 201 to 204. In an example, the number of time domain symbols indicated by a base station is L=4, so it is calculated according to the above method that $N'_{RE}=12 \times 4-N_{DMRS}^{RE}-0$, where $N_{DMRS}^{RE}=12$ is one symbol, and $n_{PRB}=1$ PRB is allocated in the frequency domain. Therefore, $N_{RE}=N'_{RE} \times 1=36$. In addition, the number of occupied time units m is 4, and Imcs=4. According to table 1, R=308/1024 is obtained. Then R'=R×m=308/1024× 4=1.2. Therefore, then it's calculated $N_{info}$32 $N_{RE} \cdot R' \cdot Q_m \cdot \upsilon=36 \times 1.2 \times 2 \times 1=87$ bits, where v=1 is the number of MIMO layers. Then, after quantizing $N_{info}$ according to the predefined rules in the standard TS 38.214, TSB=88 bits is obtained.

TABLE 1

| MCS table | | | |
|---|---|---|---|
| MCS serial number $I_{MCS}$ | Modulation order $Q_m$ | Target code rate R × 1024 | Spectral efficiency |
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| ... | ... | ... | ... |

In one embodiment of Method 2, the number of REs to be used for calculating the TBS is determined according to the number of time domain symbols L indicated by a base station and the number of time unit m occupied by one PUSCH transmission. Then, UE obtains a non-quantized intermediate variable ($N_{info}$) according to $N_{info}=N_{RE} \cdot R \cdot Q_m \cdot \upsilon$, where R is the code rate indicated in the MCS table, Qm is the modulation order, and v is the number of MIMO layers. The number of REs calculated by method 2 is the number of REs occupied by one actual transmission of a TB, which is more direct.

In an embodiment, $N_{symb}^{sh}$ equations can be replaced by L×m. Such replacement can be understood as the number of all symbols in m time unit actually occupied by one PUSCH transmission. In addition, $N_{DMRS}^{RE}$ may be the sum of the number of REs of all DMRS in all resources occupied by one PUSCH transmission. At this time, $N'_{RE}$ calculated according to the equation $N'_{RE}=N_{sc}^{RB} \cdot N_{symb}^{sh}-N_{DMRS}^{PRB}-N_{oh}^{PRB}$ is not the number of REs in one PRB, but the number of REs of one frequency domain unit in m time unit. Therefore, there is no need to perform the minimum operation with 156 (i.e., perform the minimum operation with 156*m). Subsequently, it is multiplied by the total number of PRBs ″PRB allocated to the UE. This method is suitable for the case where the number of symbols in each repetition is the same.

In Type B repetition transmission, L can be the number of symbols of a nominal repetition. This method only needs to be changed when calculating the actual number of REs. As the time domain resource allocation indication illustrated in FIG. 5, repetition 1 occupies 4 time units 101 to 104, and repetition 2 occupies 4 time units 201 to 204. In an example, L=6 is the number of time domain symbols indicated by a base station, the number of time units m is 4, and there is one DMRS symbol in each time unit, so there are 4 DMRS symbols in total, where $N_{DMRS}^{RE}=12 \times 4=48$ is one symbol. Then $N'_{RE}=12 \times 6 \times 4-48-0=240$ is calculated according to the above method. Although $N'_{RE}>156$ at this time, actually, $N'_{RE}$ is the number of all resources occupied by one PUSCH transmission, which is larger than the number of REs in one RB, and $n_{PRB}=1$ PRB is allocated in the frequency domain. Therefore, $N_{RE}=N'_{RE}1=240$. In addition, Imcs=4. R=308/1024 is obtained according to table 1. Therefore, it is calculated that $N_{info}=N_{RE} \cdot R \cdot Q_m \cdot \upsilon=240 \times 0.3 \times 2 \times 1=144$ bits, where v=1 is the number of MIMO layers. After quantizing $N_{info}$ according to the predefined rules in TS 38.214, TSB=144 bits is obtained.

In another embodiment, the determined total number of allocated REs is replaced by $N_{RE=min}(156, N'_{RE}) \cdot n_{PRB} \cdot m$, where m is the number of time unit occupied by one PUSCH transmission, or a predefined or configured coefficient. This method can ensure that the number of REs in each RB does not exceed 156, which can avoid the wrong behavior caused by improper configuration.

As the time domain resource allocation indication illustrated in FIG. 5, repetition 1 occupies 4 time units 101 to 104, and repetition 2 occupies 4 time units 201 to 204. In an example, L=6 is the number of time domain symbols indicated by a base station, the number of time units m is 4, and the number of DMRS is $N_{DMRS}^{RE}=12$. Then $N'_{RE}=12\times6-12=60$ is calculated according to the above method, and $n_{PRB}=1$ PRB is allocated in the frequency domain. In addition, using the equation to calculate the number of REs $N_{RE}=\min(156, N'_{RE})\cdot n_{PRB}\cdot m=60\times1\times4=240$, then $N_{RE}=N'_{RE}\times1=240$. In addition, Imcs=4. R=308/1024 is obtained according to table 1. Therefore, it is calculated that $N_{info}=N_{RE}\cdot R\cdot Q_m\cdot\upsilon=240\times0.3\times2\times1=144$ bits, where $\upsilon=1$ is the number of MIMO layers. After quantizing $N_{info}$ according to the predefined rules in TS 38.214, TSB=144 bits is obtained.

Particularly, because the number of symbols or REs in each time unit may be different, when calculating the available REs by the above method 2, it is necessary to add the number of REs in each time unit.

In the above method for determining a TBS, when the number of REs occupied by other overhead in each PUSCH transmission is the same, $N_{oh}^{PRB}$ can be the overhead occupied by each PRB. Therefore, $N_{oh}^{PRB}$ in the above equation can be replaced by $N_{oh}^{PRB}\times m$ (i.e., the total overhead in m time unit). Because $N_{oh}^{PRB}$ is usually semi-statically configured through RRC signaling, therefore, when switching among in m different time units through DCI, it can be adapted to different situations without changing the configuration of $N_{oh}^{PRB}$.

In addition, $N_{oh}^{PRB}$ can also be the overhead in all time units occupied by each PUSCH transmission. Therefore, when the number of time unit m occupied by each PUSCH transmission is dynamically indicated by DCI, $N_{oh}^{PRB}$ and the like also needs to be obtained by dynamic indication or according to predefined rules. For example, a column of parameters of the RE overhead used to support determining a TBS can be added to the TDRA table. This method is more flexible and accurate.

Since the number of symbols in m time unit occupied by a PUSCH or in m time unit used to calculate a TBS may be the same or different, the predefined rules can be as follows: calculate the RE overhead in each time unit according to the ratio of the number of actual symbols or REs in each time unit to a reference number, and the total overhead $N_{oh}^{PRB}$ is the sum of calculated RE overhead in each time unit, wherein the reference number can be pre-configured by a base station. Alternatively, the total overhead $N_{oh}^{PRB}$ (i.e., the actual overhead used to calculate TBS) can be calculated according to the ratio of the number of all the actual symbols or REs occupied by the PUSCH to a reference number, or the ratio of the number of actual symbols or REs occupied by all time units used to calculate TBS. Similarly, the above number of symbols and number of REs can be the number of symbols L indicated by a base station and the number of REs in the number of symbols L indicated by a base station.

Particularly, for example, each time unit (or only one time unit) in a plurality of time units has S symbols or Z RE, while the reference number is 14 symbols or 144 REs, and the base station configures the UE with an overhead $N_{oh}^{Ref}$ corresponding to the reference number. For example, the RE overhead in each time unit can be calculated according to the ratio of S symbols or Z RE to the reference number and the overhead $N_{oh}^{Ref}$. For example, the RE overhead in each time unit is $$\frac{S}{\text{reference number}}\times N_{oh}^{Ref} \text{ or } \frac{Z}{\text{reference number}}\times N_{oh}^{Ref}.$$

Similarly, the overhead corresponding to one nominal repetition can be calculated and obtained according to the ratio of the number of symbols S (such as the number of symbols indicated in DCI) or the number of RE Z to the reference number and the overhead $N_{oh}^{Ref}$, or the overhead corresponding to one PUSCH transimission can be calculated and obtained according to the ratio of the number of all symbols S or the number of RE Z to the reference number and the overhead $N_{oh}^{Ref}$.

In addition, the modulation order Qm can also be given by Imcs table, or be predefined or configured by other signaling. For example, for coverage enhancement scenarios, the modulation scheme can be predefined as a low-order modulation scheme such as QPSK or pi/2 BPSK. Therefore, in the above method, when determining a TBS, Qm does not use the value indicated in Imcs table. When calculating the actual code rate, it can be converted, such as R×q', where q' is the modulation order indicated in the corresponding MCS table. In this way, the spectral efficiency can be maintained as the spectral efficiency indicated in the MCS table. In this case, the existing 5-bit MCS table can be completely reused, and a larger TBS can be indicated.

On the other hand, since a higher TBS can be indicated by way of a PUSCH transmission on multiple time units for scenerios with enhanced coverage, the load for supporting Imcs in DCI can be clipped. For example, only 3 bits or 4 bits are used to indicate low-order modulation. The DCI overhead can be reduced in this way.

In addition, the number of REs used to determine a TBS is the number of REs assumed when performing rate matching. In addition, the number of REs used to determine the TBS is different from the number of REs assumed when performing rate matching. The method for calculating the number of REs involved in the above method can be applied to calculate the number of REs when performing rate matching. When determining the TBS and performing rate matching, UE can calculate the number of REs according to different parameters configured or by using different methods.

The method for indicating the number of time unit m will be described in detail with specific embodiments below.

One time unit can be defined or configured as one or several slots, one or several symbols, one or several nominal repetitions, or one or several actual repetitions. In addition, the number of symbols in multiple time units occupied by one PUSCH transmission can be the same or different. For example, the number of symbols in multiple actual repetitions occupied by one PUSCH transmission may be different.

The UE can obtain the number of multiple time units m occupied by one PUSCH transmission by at least one of the following three methods.

In one embodiemnt of Method 1, add a dedicated field for indicating the number of time unit m in the scheduling DCI, or re-parse the existing field or information. The method of adding additional dedicated field is more flexible, and the method of re-parsing existing field has lower DCI overhead. For example, in the coverage enhancement scenario, in order to improve the power spectrum efficiency, the energy is concentrated in a smaller bandwidth (such as one PRB or several subcarriers). If the size of the frequency domain resources is fixed, there is no need to indicate the number of frequency domain resource blocks, so the field indicating the number of frequency domain resource blocks can be re-parsed as the number of occupied time domain unit. In an example, if a transmission mode in which one PUSCH transmission occupies multiple time units is configured, the resources occupied by the PUSCH in the frequency domain are fixed as one PRB (or fixed as other frequency domain unit).

The base station can configure a maximum number of PRBs or the number of resource block groups (RBGs) through higher layer signaling. Wherein RBG is the minimum granularity for frequency domain resource allocation. When calculating DCI load, the number of bits indicating frequency domain resource allocation can be obtained according to the maximum number of PRBs or the number of PRBs. Compared with the case where there is no limit to the maximum number of PRBs, the number of bits required may be reduced. Particularly, the base station can configure the maximum number of frequency domain resources to be 1 PRB or 1 RBG. Then, only Log2(M) bits are needed to indicate frequency domain resources, where M is the number of frequency domain resource unit that can be used for scheduling. This method is widely applicable to the transmission method where one PUSCH transmission occupies multiple time units, and especially, the coverage and throughput of the uplink channel can be improved by reducing the frequency domain resources occupied.

For example, in the current NR system, by jointly coding the starting PRB position $RB_{Start}$ and the number of PRBs $L_{RB}$, and indicating the frequency domain resource allocation by a resource indication value (RIV), $L_{RB}$ obtained according to the RIV indication can be parsed as the number of multiple time units m occupied by one TB. The PRB indicated by $RB_{Start}$ is the frequency domain resource position occupied by the channel.

For example, it is possible to dynamically switch between one PUSCH transmission occupying multiple time units or occupying multiple PRBs by determining whether to parse $L_{RB}$ as the number of multiple time units occupied by one PUSCH transmission. The number of time unit m can be indicated by adding 1 bit to DCI, or determined according to different RNTI, DCI formats, DCI sizes and/or a related transmission modes configured by a certain DCI format.

In one embodiment of Method 2, add an additional indication of the number of time unit m in the TDRA table. This method can provide certain flexibility to the base station without increasing the overhead of DCI.

In the time domain resource allocation shown in table 2 below, the TDRA table includes a start and length indicator value (SLIV) for indicating the provision of the starting symbol S and length L (jointly-coded), or directly indicating the starting symbol S and length L, and/or the slot deviation $K_2$ value and/or the mapping type, and/or the number of time unit m occupied. Alternatively, the value of the number of repetitions in the existing TDRA table can be reinterpreted as the number of time unit m. In addition, on the basis of supporting one PUSCH transmission occupying multiple time units m, additional RRC can be added to indicate the number of repetitions. Alternatively, a new parameter may be introduced into the TDRA table to indicate the number of time unit m. Particularly, when m=1, it degenerates into one time unit, which is the existing Type A or Type B repetition transmission method. In this way, different repetition modes can be switched implicitly and flexibly.

In one embodiment of Method 3, indicate the number of time unit m in RRC. The related number of time unit m can be configured for different PDCCH search spaces, CORSET, DCI formats, RNTI, etc. For example, one PUSCH transmission occupying m=4 time units is configured for DCI format 1. This method can reduce the overhead of RRC signaling.

TABLE 2

Time domain resource allocation table

| Serial number | PUSCH mapping type | K2 | S | L | The number of repetitions or the number of time unit m occupied by one PUSCH transmission |
|---|---|---|---|---|---|
| 0 | Type A | j | 0 | 2 | 1 |
| 1 | Type A | j | 0 | 7 | 1 |
| 2 | Type A | j | 2 | 8 | 2 |
| 3 | Type B | j | 1 | 8 | 2 |
| 4 | Type B | j | 8 | 6 | 3 |
| 5 | Type B | j | 10 | 4 | 3 |
| 6 | Type B | j | 4 | 6 | 6 |
| 7 | Type A | j + 1 | 0 | 14 | 8 |

For the case where the number of repetitions rep and the number of time unit m occupied by a PUSCH transmission are respectively configured, the UE can obtain the time domain transmission allocation by one of the following methods. Wherein, the number of time unit or symbols actually occupied by each PUSCH repetition may be the same or different.

In one embodiment of Method A, one PUSCH transmission occupies m time unit, and the TB occupying m time unit is retransmitted rep times. This configuration method can directly indicate the number of actual repetitions of a PUSCH, which is the most flexible way.

As shown in FIG. 5, one PUSCH transmission occupies 4 time units, and two repetition transmission are performed. Wherein, the first repetition occupies time units 101-104 and the second repetition occupies time units 201-204.

In one embodiment of Method B, determine the time domain resources of all transmission through the time domain resources occupied by one PUSCH transmission and the number of repetitions rep. On this basis, the method for rate matching and/or RE mapping is determined according to the number of time unit m occupied by a PUSCH transmission. This configuration can ensure that the actual transmission time may not exceed the maximum transmission time indicated in the existing configuration, thus avoiding resource waste. In addition, this method can be applied to both Type A and Type B repetition transmission methods.

Particularly, the UE obtains the time domain resource allocation, and the time domain resource allocation includes a slot position K, a starting symbol position S, the number of symbols L and the number of repetitions rep, wherein the number of repetitions rep is used for determining the time domain resource position occupied by the whole transmission. In addition, the UE also obtains the number of time unit m occupied by one PUSCH transmission. For the case where m is not divisible by the number of actual repetitions rep, the number of actual repetitions of one PUSCH is floor(rep/m) or ceiling(N/m). This ensures complete transmission of TB every time.

Figure 6:
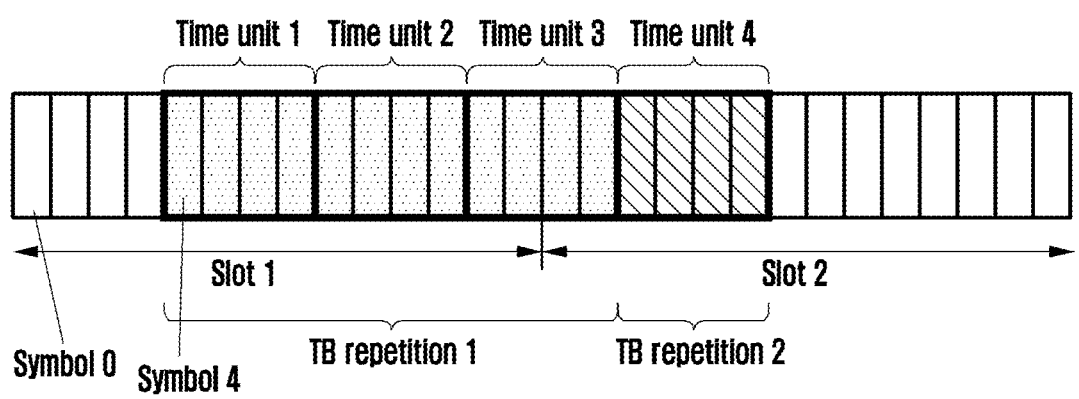
FIG. 6 is a schematic diagram illustrating slot positions, starting symbol positions, the number of symbols, the number of repetitions (rep) and the number of time unit m occupied by one PUSCH according to various embodiments of the present disclosure.

FIG. 6 is a schematic diagram illustrating slot positions, starting symbol positions, the number of symbols, the number of repetitions (rep) and the number of time unit m occupied by one PUSCH transmission according to various embodiments of the present disclosure. In the example shown in FIG. 6, K can indicate slot 1, starting symbol position S=4, the number of symbols L=4, the number of repetitions rep=4, and the number of time units m=3 occupied by one PUSCH transmission (TB1). At this time, only transmitting floor(rep/m)=1 time, that is, time unit 1 to time unit 3.

Alternatively, in the first floor(rep/m) repetitions, each TB occupies m time unit, and the last PUSCH transmission occupies rep-floor(rep/m) time unit. In this way, the time domain resources occupied by actual transmission are the same as those directly configured by a base station. For rep-floor(rep/m) remaining time unit smaller than m time unit configured by a base station, a complete TB transmission can be performed by way of rate matching. Alternatively, only part of the original rate matched time units are transmitted.

In the example shown in FIG. 6, K can indicate slot 1, the starting symbol position S=4, the number of symbols L=4, the number of repetitions rep=4, and the number of time units m=3 occupied by one PUSCH transmission. At this time, in the first floor(rep/m)=1 repetition, a complete TB is transmitted, that is, one PUSCH is transmitted in time unit 1 to time unit 3. While the remaining time unit 4 only transmits a part of a TB. Alternatively, the last PUSCH performs data rate matching on the remaining time unit. This method makes the transmission in which one PUSCH occupies multiple time units have the same transmission length as the transmission method in which one PUSCH occupies only one time unit under the same configuration. For method A, the actual transmission time is not greater than the maximum transmission time of the existing system. A base station may additionally configure or specify the maximum transmission length/time M. Therefore, for method A, the actual transmission duration is the maximum transmission length/time M. Particularly, the actual transmission duration is min{L*m*rep, M}, where L is the length of one time unit, m is the number of time unit occupied by one PUSCH transmission, and rep is the number of PUSCH repetitions. For the scenario where M<L*m*rep, it can be processed in a similar way to floor/ceiling in method B, specifically, rep can be replaced by M.

Figure 7:
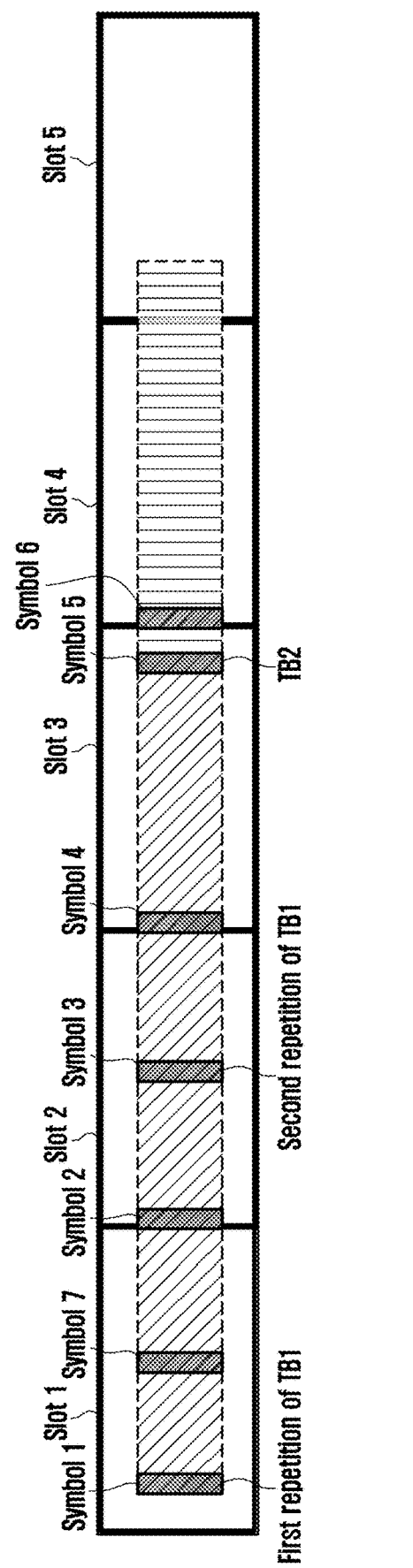
FIG. 7 is a schematic diagram illustrating slot positions, symbol positions, the number of repetitions (rep), and multiple TB according to various embodiments of the present disclosure.

The method for obtaining the DMRS position for further obtaining $N_{DMRS}^{PRB}$ will be described in detail with reference to FIGS. 7-9 in combination with specific embodiments.

For Type A PUSCH repetition transmission mode, the time domain position of DMRS is determined according to the position occupied by each repetition of the configured (i.e., the actually transmitted) PUSCH. Another way is that the time domain position of DMRS is determined according to the position of the first symbol of each slot and the number of occupied symbols.

For Type B PUSCH repetition transmission, it only supports to determine the time domain position of DMRS according to the position occupied by each actual repetition, and does not support the method of determining the time domain position of DMRS according to the position of the first symbol in each slot.

For the case where one PUSCH transmission occupies multiple time units, the time domain position of DMRS can be determined by one of the following methods.

Time domain position of DMRS can be determine according to each time unit. Wherein, one time unit can be defined or configured as one or several slots, one or several symbols, one or more nominal repetitions, or one or more actual transmission. In addition, the number of symbols in multiple time units occupied by one PUSCH transmission can be the same or different.

Particularly, the time domain position of DMRS is determined according to one or more of the followings: the starting symbol position of a time unit, the number of symbols in a time unit, the position of the first symbol belonging to the same PUSCH transmission in one or more time units, the position of the first symbol of all PUSCH carrying the same TB in one or more time units, the number of all symbols of all PUSCH transmission carrying the same TB in one or more time units, the position of the first symbol of all PUSCH transmission carrying multiple TBs in one or more time units, and the number of all symbols of all PUSCH transmission carrying multiple TBs in one or more time units. Wherein, all TBs come from the same user equipment (UE) or a base station.

In an example, a time unit is a slot, and the time domain position of DMRS is determined according to the position of the first symbol of the slot. Particularly, the relative position relationship between the time domain position of the first DMRS and the first symbol of the slot is predefined, configured or obtained according to rules. This method can ensure that each time unit includes DMRS symbols. For example, it is obtained that the time domain position of the first DMRS is 3 or 7 symbols apart from the first symbol of the slot.

In addition, the position of the additional DMRS can be determined according to the position and/or the number of symbols of the same PUSCH transmission or all or part of a PUSCH transmission carrying the same TB in the slot. FIG. 7 is a schematic diagram illustrating slot positions, symbol positions, the number of repetitions (rep), and multiple TB according to various embodiments of the present disclosure. As shown in FIG. 7, symbol 1 is obtained as the first DMRS according to the relative position between the time domain position of the first DMRS and the first symbol of slot 1. According to the same repetition occupies 12 symbols of 14 symbols in the slot, the additional DMRS is determined to be at the position of symbol 7. This method can be easily extended according to the existing DMRS time-domain position determination method, and has low implementation complexity.

In another example, a time unit is a slot, and the time domain position of DMRS is determined according to the position of the first symbol belonging to the same PUSCH transmission in time unit and/or the number of symbols belonging to the same PUSCH transmission in time unit. For example, the predefined DMRS symbol is the first symbol of each repetition of the same TB in each slot. As shown in FIG. 7, in slot 2, there is a part of the first repetition of TB1 and a part of the second repetition of TB1. It can be determined that in slot 2, the first symbol of the first repetition of TB1 is symbol 2, and the first symbol of the second repetition of TB1 is symbol 3. Then it is determined that symbol 2 and symbol 3 are time domain positions of DMRS (i.e., symbol 2 and symbol 3 transmit DMRS).

In another example, a time unit is a slot, and the time domain position of DMRS is determined according to the position of the first symbol of all repetition carrying the same TB in time unit and/or the number of symbols of all repetition carrying the same TB in time unit. This method can avoid unnecessary pilot overhead. For example, the predefined DMRS symbol is the first symbol of each repetition of the same TB in each slot. As shown in FIG. 7, in slot 2, there is a part of the first repetition of TB1 and a part of the second repetition of TB1. It can be determined that in slot 2, the first symbol that belongs to the same TB1 is symbol 2. Therefore, it is determined that symbol 2 transmits DMRS. In this method, symbol 3 does not transmit DMRS. As shown in FIG. 7, in slot 3, there is a part of the repetition of TB1 and a part of the repetition of TB2. It can be determined that in slot 3, the first symbol of all repetition of TB1 is symbol 4, and the first symbol of all repetition of TB2 is symbol 5, thus symbols 4 and 5 are determined to transmit DMRS.

In another example, a time unit is a slot, and the time domain position of DMRS is determined according to the position of the first symbol of all repetition carrying multiple TBs in time unit and/or the number of symbols of all repetition carrying multiple TBs in time unit. For example, it is predefined that the DMRS symbol is the first symbol of all repetition of multiple TBs in each slot. As shown in FIG. 7, in slot 3, there is a part of the repetition of TB1 and a part of the repetition of TB2. In slot 3, the first symbol of all repetition of all TBs is symbol 4. Therefore, it is determined that symbol 4 transmits DMRS. In this method, symbol 5 does not transmit DMRS.

In yet another example, the time unit may be one or more repetitions (one PUSCH transmission), and particularly, in the Type B PUSCH repetition method, one time unit may be one or more nominal repetitions, or one or more actual repetitions.

Figure 8:
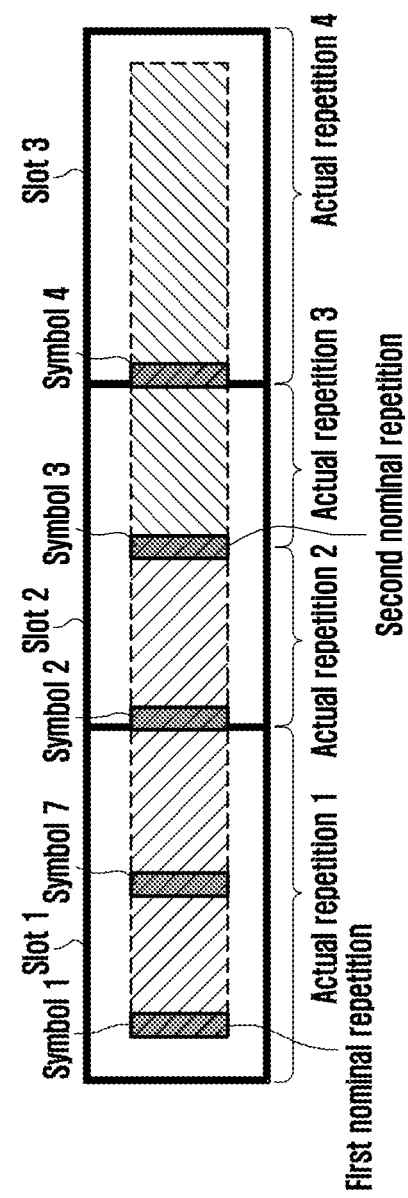
FIG. 8 is a schematic diagram illustrating Type B-based PUSCH repetition according to various embodiments of the present disclosure.

FIG. 8 is a schematic diagram illustrating Type B-based PUSCH repetition according to various embodiments of the present disclosure. As shown in FIG. 8, TB 1 is retransmitted according to the Type B mode. The first nominal repetition of TB1 spans slot 1 and slot 2 and the second nominal repetition of TB 1 spans slot 2 and slot 3. Therefore, according to the Type B repetition transmission mode, the first nominal repetition is divided into two actual transmission (actual transmission 1 and actual transmission 2) due to the slot edge, and the second nominal repetition is divided into two actual transmission (actual transmission 3 and actual transmission 4) due to the slot edge.

If a time unit is one nominal repetition, the DMRS symbol position can be determined according to the starting position and the number of symbols of one nominal repetition. Particularly, as shown in FIG. 7, the starting position of the first nominal repetition is symbol 1, then the DMRS symbol position is determined to be symbol 1. The starting position of the second nominal repetition is symbol 3, then the DMRS symbol position is determined to be symbol 3.

In addition, if additional DMRS is configured, the additional DMRS symbol position is determined according to the symbol length L of the nominal repetition. As shown in FIG. 8, the additional DMRS occupies symbol 7 in the first nominal repetition.

If a time unit is one actual repetition, the DMRS symbol position can be determined according to the starting position and number of symbols of each actual repetition transmission. Particularly, as shown in FIG. 8, the starting positions of four actual repetitions are symbol 1, symbol 2, symbol 3 and symbol 4, respectively, and these symbols are determined as DMRS symbol positions.

In addition, in an example, if additional DMRS is configured, the additional DMRS symbol position is determined according to the symbol length L of the repetition. As shown in FIG. 8, the additional DMRS occupies symbol 7 in the actual repetition 1. Accordingly, the symbol position occupied by additional DMRS in each actual repetition (not shown in the example of FIG. 8) can be determined. The advantage of this method is that the density of time domain DMRS can be guaranteed to be similar to the existing repetition method.

In another example, additional DMRS symbol position can also be determined according to all symbols of all repetitions (PUSCH transmission) occupied by each TB. This method has the lowest pilot overhead. In an example, one PUSCH transmission occupies $L_{all}$ symbols, so according to predefined rules, a DMRS is inserted in the first symbol, and DMRSs are inserted every $D_{dmrs}$ symbols. These all $L_{all}$ symbols can be continuous or discontinuous. The $L_{all}$ symbols can occupy resources in one or more slots.

In another example, additional DMRS symbol position can also be determined according to the continuous symbols in one or more repetitions of each TB. This method ensures that each continuous repetition has pilot symbols, without UE keeping phase continuity in discontinuous transmission, which reduces the implementation complexity. In another example, DMRS symbol position can be determined according to the continuous symbols in one or more repetitions carrying one TB as a new transport resource block. For example, take the first symbol of the new transport resource block as DMRS, and/or determine the additional DMRS symbol position according to the length of the new transport resource block (if additional DMRS is to be configured).

Figure 9:
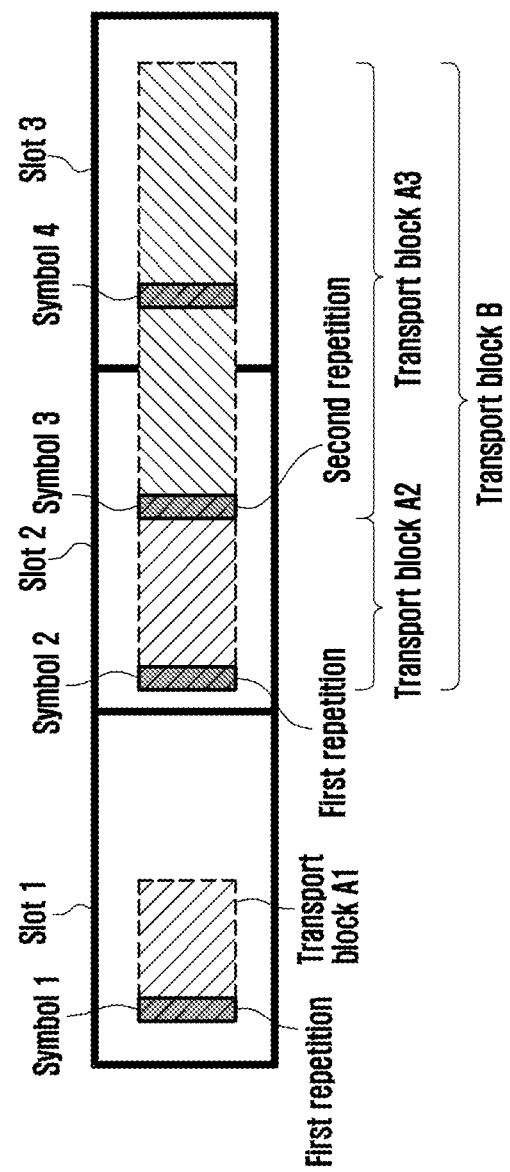
FIG. 9 is a schematic diagram illustrating one repetition occupies a plurality of discontinuous transport resource blocks according to various embodiments of the present disclosure.

FIG. 9 is a schematic diagram illustrating one repetition occupies a plurality of discontinuous transport resource blocks according to various embodiments of the present disclosure. As shown in FIG. 9, the first repetition occupies the transport resource block A1 and the transport resource block A2, which are two discontinuous transmission. The second repetition consists of a transport resource block A3 composed of a plurality of continuous symbols. According to the continuous symbols in the first repetition as one transport resource block A1, the DMRS symbol position is determined as symbol 1; according to the continuous symbols in the first repetition as one transport resource block A2, the DMRS symbol position is determined as symbol 2; and according to the continuous symbols in the second repetition as one transport resource block A3, the DMRS symbol position is determined as symbol 3.

In addition, if additional DMRS is configured, the additional DMRS symbol position is determined according to the symbol length in the transport resource block. In this method, the symbol length in each transport resource block is taken as the unit to determine the additional DMRS symbol position, which can reduce the pilot overhead. In an example, as shown in FIG. 9, the lengths of the transport resource block A1 and the transport resource block A2 do not meet the condition of inserting additional DMRS, so there is no additional DMRS. While the transport resource block A3 of the second repetition satisfies the condition of inserting additional DMRS, it is determined that the additional DMRS occupies symbol 4 in the transport resource block A3.

In another example, as shown in FIG. 9, all repetitions of one PUSCH are divided into a transport resource block A1 and a transport resource block B, which are two discontinuous transmission. Wherein, the transport resource block B includes a part of the symbols of the first repetition and the symbols of the second repetition. The DMRS symbol position is determined as symbol 1 according to the first transport resource block A1; and the DMRS symbol position is determined as symbol 2 according to the transport resource block B. In this method, a DMRS is not inserted at the first symbol 3 of the second repetition.

In an example, as shown in FIG. 9, the length of the transport resource block A1 does not meet the condition of inserting additional DMRS, so there is no additional DMRS. While the transport resource block B satisfies the condition of inserting additional DMRS, it is determined that an additional DMRS occupies symbol 4 in the transport resource block B. This method can achieve more uniform pilot insertion, thus better channel estimation performance can be obtained.

For the case of discontinuous transmission, if an interval is less than a predetermined value, the UE can keep its transmission phase unchanged. That is, for two transport resource blocks which are discontinuous transmission, the channel can be jointly estimated. Therefore, it is also possible to uniformly determine and insert pilots for this set of transport resource blocks that can keep phase, thereby reducing pilot overhead.

In an example, as shown in FIG. 9, if the interval between the transport resource block A1 and the transport resource block A2 is less than a predetermined value, the UE may keep the transmission phases of two discontinuous transmission unchanged. Therefore, the position of the pilot can be determined according to the number of symbols actually occupied by the transport resource block A1 and the transport resource block A2. For example, if there are 5 symbols in the transport resource block A1 and 4 symbols in the transport resource block A2, then 4+5 is greater than the predetermined value for inserting additional DMRS pilot, and the position of additional DMRS in time domain is determined according to 4+5=9 symbols. Alternatively, the position of additional DMRS in time domain may be determined according to the total number of symbols spanned from the first symbol of the transport resource block A1 to the last symbol of the transport resource block A2. The former method can guarantee that additional pilot may be transmitted. The latter method may result in that the time domain position of additional DMRS is not actually transmitted.

As different UE may have different intervals for which the transmission phase can be kept unchanged, the UE can report its capability to a base station, and the UE can determine the time domain position of DMRS by deciding the transport resource block set that can keep the transmission phase unchanged according to its reported capability. The base station can also determine the time domain position of DMRS and perform channel estimation according to the received UE capability. Alternatively, the base station may also configure a predetermined value for modifying the time interval to the UE according to the capability reported by the UE.

The above methods for determining DMRS are also applicable to transmission using the existing PUSCH repetition transmission mode.

In addition, when one PUSCH transmission is transmitted on multiple time units, power control, cancellation and delay of uplink transmission can be performed in different time units.

In the existing NR system, the adjustment of power control is performed with a unit of each repetition transmission. For the Type B repetition transmission method, the adjustment of power control can be performed with a unit of each actual transmission. If transmission for which one PUSCH transmission occupies multiple time unit and/or a UE keeps phases between discontinuous transmission or different transmission being continuous are supported, the adjustment of power control can be performed with a unit of at least one of the followings:

performing power control adjustment with a unit of all symbols of one repetition or all repetitions occupied by each TB. In this way, the power of the transmitted TB can be kept unchanged in one transmission;

performing power control adjustment with a unit of time unit for determining a TBS, for example, one or more slots, one or more actual repetitions, one or more nominal repetitions, etc. This makes it easier to be compatible with other transmission;

performing power control adjustment with a unit of one or more transport resource blocks for determining the frequency domain position of DMRS. In this way, the problem that part of transmission do not have valid DMRS due to power control adjustment can be avoided; and performing power control adjustment with a unit of one or more transport resource blocks capable of keeping the phase unchanged. In this way, it can reduce the dynamically changed processing of various complex situations at the receiving end, and simplify the channel estimation and decoding complexity at the receiving end.

In the existing NR system, dynamic slot format indication (SFI) is used to cancel the transmitting or receiving of semi-static configuration on flexible slots/symbols. For example, for uplink configuration grant, if SFI indicates that a symbol is a downlink or flexible symbol, one PUSCH repetition including the symbol indicated by the uplink configuration grant may be canceled.

For a transmission method in which one PUSCH transmission occupies multiple time units, the transmission can be canceled or delayed according to the following time unit, where the cancellation or delay is indicated by SFI or UL CI:

Performing the cancellation or delay of a transmission with a unit of one repetition or all repetitions occupied by each TB. This can avoid canceling or delaying a part of a transmission of one TB;

Performing the cancellation or delay of a transmission with a unit of time unit for determining a TBS. For example, time unit may be one or more slots, one or more actual repetitions, one or more nominal repetitions, etc. This makes it easier to be compatible with other transmission;

Performing the cancellation or delay of a transmission with a unit of one or more transport resource blocks for determining the frequency domain position of DMRS. In this way, problems such as no DMRS or unbalanced DMRS in a part of transmission after cancellation or delay can be avoided; and Performing the cancellation or delay of a transmission with a unit of one or more transport resource blocks capable of keeping the phase unchanged. This can simplify the complexity of channel estimation and decoding at the receiving end.

In addition, one PUSCH transmission can be configured or scheduled for ni repetitions by a base station. Some resources are resources unavailable for transmission, so the number of actual transmission may be less than the scheduled $n_1$ times. However, due to the limited overhead for indicating the number of transmission, the granularity for indicating the number of repetitions is limited. Therefore, it may happen that the base station side schedules $n_1$ repetitions, but actually the UE side only needs m repetitions, where $m<n_1$. However, according to predefined rules and/or configurations, the number of times that can be actually transmitted in ni repetitions is n', where $m<n'<n_1$. But the next granularity that can be scheduled is $n_2$, and $n_2<m$. That is, if the base station schedules $n_2$ repetitions and cannot meet the number of repetitions, the base station can dynamically or semi-statically indicate the maximum number of repetitions m and a scheduled number of repetitions n for the UE. Therefore, the UE actually transmits only m times.

Figure 10:
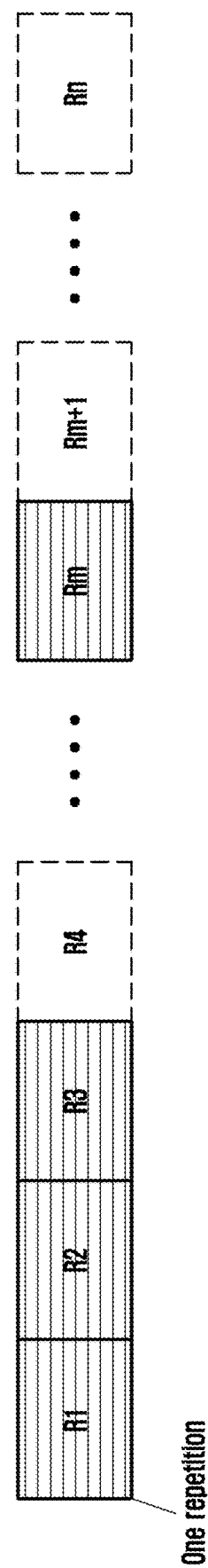
FIG. 10 is a schematic diagram illustrating that repetition transmission has been performed for one TB for n times.

Particularly, FIG. 10 illustrates that one TB has been retransmitted n times. As shown in FIG. 10, a base station schedules n repetitions. All the resources for repetitions are $R_1 \sim R_n$, but $R_4$ is unavailable resource, so no actual transmission is carried out on $R_4$. The UE has transmitted m repetitions when performing transmission on Rm resource. Then, the UE does not continue transmission on $R_{m+1} \sim R_n$ resources. This method can achieve the required performance with low scheduling overhead without wasting resources.

In addition, in the existing communication system, because the uplink transmission power is limited, the uplink coverage is usually the bottleneck of the system coverage. And multiple uplink channels may not be able to be transmitted at the same time due to limited terminal capabilities. To solve this problem, the followings provides a method in which uplink control information (UCI) can be multiplexed to one PUSCH occupying one or more time units for transmission.

Figure 11:
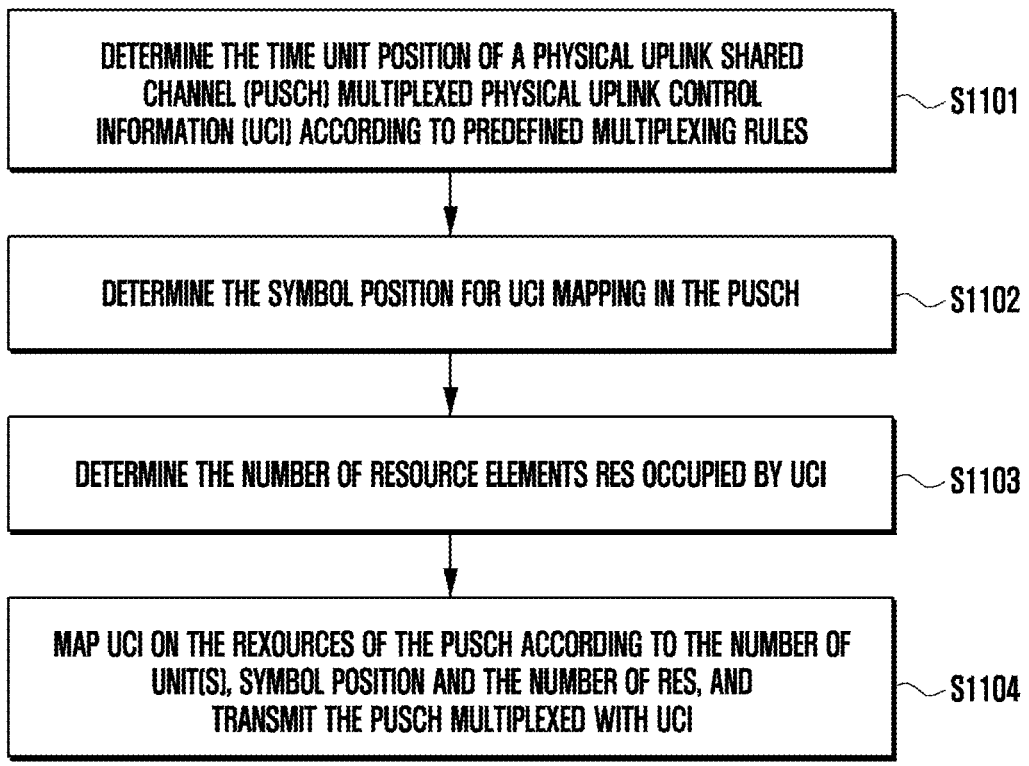
FIG. 11 illustrates a flowchart of a method for uplink control information (UCI) transmission according to various embodiments of the present disclosure.

The method for UCI transmission will be described in detail with reference to FIG. 11 and specific embodiments. FIG. 11 illustrates a flowchart of a method for UCI transmission according to various embodiments of the present disclosure.

With reference to FIG. 11, at S1101, a UE determines the time unit position of a physical uplink shared channel PUSCH multiplexed physical uplink control information UCI according to predefined multiplexing rules. Wherein, the PUSCH occupies one or more time units. Wherein, the time unit position for UCI multiplexing in a PUSCH may be one or more time unit positions. In addition, the time unit position for UCI multiplexing in a PUSCH may be the first time unit position carrying UCI information, the first time unit position occupied by the PUSCH multiplexed with UCI, or all time unit positions occupied by the PUSCH multiplexed with UCI. In addition, in an implementation, the UE may directly determine the symbol position (including the starting symbol position) for UCI multiplexing. Alternatively, the multiplexing rules may be configured by a base station.

At S1102, the UE determines the symbol position for UCI multiplexing in a PUSCH.

Preferably, the UE determines the symbol position for UCI multiplexing in the PUSCH according to at least one of the followings: information type of UCI, UCI coding and mapping scheme, demodulation reference signal DMRS position in PUSCH, one or more time units carrying multiplexed UCI, and all time units occupied by a PUSCH. Wherein, UCI coding and mapping scheme includes puncturing mapping scheme or rate matching mapping scheme.

At S1103, the UE determines the number of resource elements REs occupied by UCI.

Preferably, the UE determines the number of resource elements REs occupied by UCI according to at least one of the followings: the number of resource elements REs in all time units occupied by a PUSCH multiplexed with UCI, the number of resource elements REs of one or more time units for UCI multiplexing, the number of time unit used for UCI multiplexing in one or more time units occupied by a PUSCH, the number of one or more time units occupied by a PUSCH multiplexed with UCI, and a code rate conversion coefficient. Wherein, the number of resource elements REs in all time units occupied by a PUSCH multiplexed with UCI is the number of all REs occupied by a PUSCH in multiple time units occupied by the PUSCH multiplexed with UCI. The number of one or more time units occupied by a PUSCH multiplexed with UCI is the total number of time unit occupied by a PUSCH multiplexed with UCI. Wherein, the rate conversion coefficient can be calculated and obtained by base station configuration or according to predefined rules.

At S1104, the UE maps UCI on the resources of the PUSCH according to the number of time unit, symbol position and the number of REs, and transmits the PUSCH multiplexed with UCI.

Preferably, mapping UCI on the resources of the PUSCH according to symbol position and the number of REs includes: rate matching and mapping the PUSCH according to the number of REs occupied by UCI; or puncturing and mapping the PUSCH according to the number of REs occupied by UCI.

In addition, before S1101 (not shown), the UE may also determine whether to multiplex UCI in a PUSCH according to predefined timing requirement(s). When UCI cannot be multiplexed on the PUSCH, one of the following operations is performed: drop all or part of the PUSCH transmission on the time unit overlapped with a physical uplink control channel PUCCH transmitting UCI; or drop the PUSCH transmission on all time units of the PUSCH overlapped with a PUCCH transmitting UCI; or delay all or part of the PUSCH transmission on time unit overlapped with the PUCCH transmitting UCI; or delay the PUSCH transmission on all time units of the PUSCH overlapped with a PUCCH transmitting UCI.

As described above with reference to FIG. 4, in order to reduce the gain of making full use of channel coding, a transport block (TB) can be transmitted in as much time as possible. In addition, the SINR of a receiving end can be improved by concentrating the energy on the limited bandwidth to provide demodulation performance. In NR system, several symbols in time are defined as one slot for time resource allocation. For a large TB, due to limited frequency domain resources, it is necessary to extend the transmission of a PUSCH carrying the TB to multiple slots for transmission. In addition, due to the limited capacity of UE, when scheduled PUCCH and PUSCH overlap in time, UCI is usually multiplexed in a PUSCH for transmission, or the channel with lower priority is dropped. In this way, the UE transmits only one uplink channel at a time, thereby reducing the maximum peak-to-average ratio (PAPR) of the UE, improving coverage and realizing complexity. UCI usually includes HARQ-ACK, SCI, SR, etc. However, UCI that can be multiplexed in a PUSCH usually does not include SR.

In an NR system, because UE needs certain time to decode a PDCCH or PDSCH or prepare a PUSCH, it is necessary to meet the fixed timing requirement(s) between a PUCCH and a PUSCH before UCI can be multiplexed onto a PUSCH. Otherwise, the UE drops the PUSCH or the PUCCH. Next, the transmission method of UCI multiplexing in one PUSCH occupying one or more time units will be described in detail.

In the existing NR system, for a PUCCH without repetition, the timing requirement(s) for UCI multiplexing in a PUSCH are determined as follows:

Within one slot, the time interval from the first OFDM symbol of the earliest transmitted channel in a PUCCH and a PUSCH overlapping in time domain to the last OFDM symbol of a PDSCH scheduled by DCI corresponding to the HARQ-ACK is greater than N1+1 symbols. Wherein, N1 is the shortest time for UE to process a PDSCH; and Within one slot, the time interval from the first OFDM symbol of the earliest transmitted channel of a PUCCH and a PUSCH overlapping in time domain to the last OFDM symbol of the latest DCI (i.e., DCI scheduling a PUSCH or DCI scheduling a PUCCH) is greater than N2+1 OFDM symbols. Wherein, N2 is the shortest time for UE to prepare a PUSCH.

In addition, since the number of bits for UCI multiplexing is indicated in the DCI for a PUSCH, the condition for UCI multiplexing in a PUSCH need further satisfy that the DCI scheduling a PUSCH is no later than the DCI scheduling the overlapped PUCCH. The PUSCH mentioned above is one repetition of a PUSCH. In the Type B repetition mode, if one nominal repetition is divided into one or more actual repetitions, the above slot condition refers to one actual repetition of a PUSCH.

When the repeated PUCCH overlaps with a PUSCH (the same transport block (TB) is repeated one or more times), in order to maintain the performance of the PUCCH, part of the PUSCH repetition overlapped with the PUCCH can be dropped, while the non-overlapping part of the PUSCH repetition are normally transmitted.

For a transmission mode in which one PUSCH repetition occupies multiple time units (for example, one or more slots, symbols, etc.), one PUSCH may occupy longer time. To reduce scheduling restrictions, whether UCI can be multiplexed in a PUSCH may be decided according to predefined condition(s), wherein the predefined condition(s) are one or more of the following timing requirement(s).

In one embodiment of requirement A, in a time unit where a PUCCH and a PUSCH overlap in time domain, the time interval from the first symbol of the PUSCH overlapped with the PUCCH to the last symbol of a PDSCH scheduled by downlink control information DCI corresponding to the HARQ-ACK is greater than a first numerical value.

In this way, the time unit in which the PUCCH and the PUSCH overlap in time domain may be determined first. As both the PUCCH and the PUSCH may occupy multiple time units, such as the case where the PUCCH is repeated, there may be one or more overlapping time units. In addition, there may be a case where the PUCCH overlaps with one or more PUSCHs. Wherein, at least one PUSCH among a plurality of PUSCHs occupies one or more time units. One PUSCH can be one of several repetitions carrying the same TB, or a PUSCH transmission carrying different TBs. For the case where a PUCCH overlaps with multiple PUSCHs, the first symbol of a PUSCH overlapped with a PUCCH refers to the first symbol of the first PUSCH among multiple PUSCHs overlapped with the PUCCH.

Figure 12:
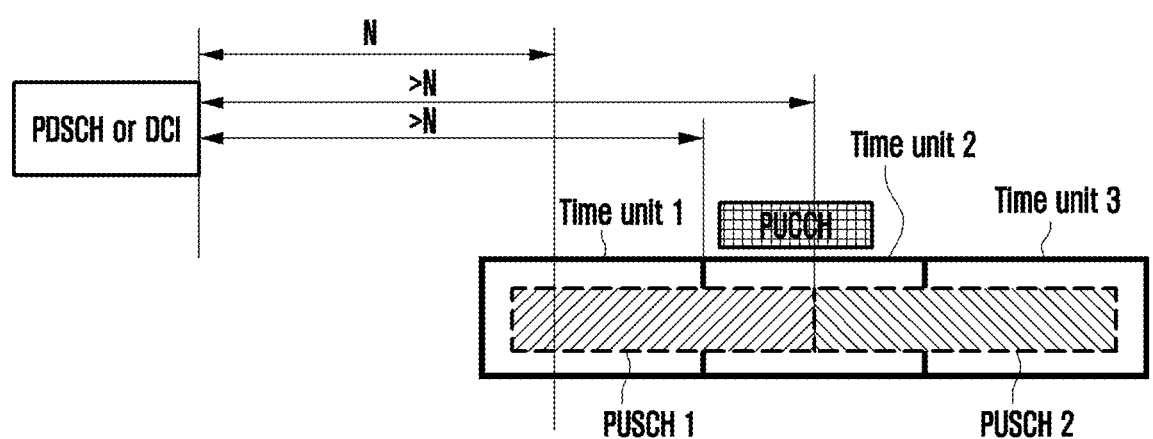
FIG. 12 illustrates a schematic diagram for deciding the timing requirement(s) for UCI multiplexing in a PUSCH according to various embodiments of the present disclosure.

Particularly, FIG. 12 illustrates a schematic diagram for decideing the timing requirement(s) for UCI multiplexing in a PUSCH according to various embodiments of the present disclosure. As shown in FIG. 12, PUSCH1 and PUSCH2 can be two repetitions of the same TB, or two PUSCHs carrying different TBs. Wherein, the PUSCH1 occupies all or part of time domain resources (such as symbols) in time unit 1 and time unit 2. The PUSCH2 occupies all or part of the time domain resources (e.g., symbols) in the time unit 2 and the time unit 3. Wherein, one time unit can be configured or defined as one or more slots or one or more symbols. One PUCCH carrying UCI is scheduled to be transmitted in time unit 2, and overlaps with PUSCH1 and PUSCH2.

With respect to timing requirement A, in time unit 2 where the PUCCH overlaps with PUSCH1 and PUSCH2 in time domain, the first symbol of the earliest transmitted channel of the PUCCH as well as PUSCH1 and PUSCH2 overlapping in time domain is the first symbol of PUSCH1 transmitted in time unit 2, and the time interval between this symbol and the last symbol in a PDSCH scheduled by DCI corresponding to the HARQ-ACK is greater than the first numerical value N. Therefore, UCI can be multiplexed in a PUSCH. In the following description, which PUSCH is selected for UCI multiplexing will be introduced.

Timing requirement A only pays attention to the position in time unit where overlapping occurs, and UCI can be multiplexed in a PUSCH as much as possible to reduce unnecessary dropping. This method is more suitable for puncturing UCI coding and mapping scheme.

In one embodiment of requirment B, in a PUCCH and PUSCH(s) overlapping in time domain, there is at least one PUSCH overlapped with the PUCCH, which satisfies that the time interval from the earliest transmitted symbol of the PUSCH in one or more time units occupied by the PUSCH to the last symbol of a PDSCH scheduled by DCI corresponding to the HARQ-ACK is greater than the first numerical value.

Similarly, there may also be cases where the PUCCH overlaps with one or more PUSCHs. And PUSCHs may occupy one or more time units. In this way, it is necessary to determine the PUSCH(s) overlapped with the PUCCH at first, and then determine whether there is at least one PUSCH which can meet the requirement that the time interval from the earliest transmitted symbol of the PUSCH for the PUSCH to the last symbol of a PDSCH scheduled by DCI corresponding to the HARQ-ACK is greater than the minimum interval of the first numerical value. If the PUSCH occupies multiple time units, it is necessary to ensure that the first symbol in the first time unit meets the minimum interval requirement.

Furthermore, as shown in FIG. 12, among a PUCCH, PUSCH1 and PUSCH2 overlapping in time domain, the earliest transmitted symbol of PUSCH2 satisfies that the time interval to the last symbol in a PDSCH scheduled by DCI corresponding to the HARQ-ACK is larger than the first numerical value N. Therefore, UCI can be multiplexed in a PUSCH. E.g., UCI being multiplexed in PUSCH 2.

Similarly, timing requirement B does not require the first PUSCH overlapped with the PUCCH to meet the timing requirement, so UCI can be multiplexed in a PUSCH as much as possible to reduce unnecessary dropping.

In one embodiment of requirment C, in a PUCCH and PUSCH(s) overlapping in time domain, the time interval from the earliest transmitted symbol of the PUSCH in one or more time units occupied by the PUSCH to the last symbol of a PDSCH scheduled by DCI corresponding to the HARQ-ACK is greater than the first numerical value.

In this way, it is required that the time interval from the earliest symbol transmitting PUSCH of the first PUSCH among one or more PUSCHs overlapped with the PUCCH to the last symbol of a PDSCH meets the condition. The advantage of this method is that UCI which meets the timing condition can be transmitted as soon as possible, and PDSCH decoding has been completed before the PUSCH multiplexed with UCI, thus supporting the rate matching mapping scheme.

In one embodiment of requirment D, in a time unit where a PUCCH and a PUSCH overlap in time domain, the time interval from the first symbol of the PUSCH overlapping the PUCCH to the last symbol of the latest DCI is greater than a second numerical value, wherein the DCI is DCI scheduling a PUSCH or DCI scheduling a PUCCH.

In the same way, this method first determines the time unit where a PUCCH and a PUSCH overlap in time domain. As both PUCCH and PUSCH may occupy multiple time units, such as the case where a PUCCH is repeated, there may be one or more overlapping time units. In addition, there may be cases where a PUCCH overlaps with one or more PUSCHs. Wherein, at least one PUSCH among a plurality of PUSCHs occupies one or more time units. For the case where the PUCCH overlaps with multiple PUSCHs, the first symbol of the PUSCH overlapped with the PUCCH refers to the first symbol of the first PUSCH among multiple PUSCHs overlapped with the PUCCH.

Similarly, the last symbol of a PDSCH in FIG. 12 may be replaced by the last symbol scheduled to the latest DCI (i.e., DCI scheduling a PUSCH or DCI scheduling a PUCCH), and the second numerical value may be set to N. As shown in FIG. 12, the timing requirement D can be met, and UCI is multiplexed in a PUSCH.

Timing D only requires the timing requirement in time unit where a PUCCH and a PUSCH overlap, and does not require the first transmission in other time unit occupied by the PUSCH to meet the timing requirement. Therefore, this method can minimize unnecessary dropping of a PUSCH or a PUCCH due to the starting position of a PUSCH being too early.

In one embodiment of requirment E, in a PUCCH and PUSCH(s) overlapping in time domain, there is at least one PUSCH overlapped with the PUCCH, which satisfies that the time interval from the earliest transmitted symbol of the PUSCH in one or more time units occupied by the PUSCH to the last symbol of the latest DCI is greater than a second numerical value, where the DCI is DCI scheduling a PUSCH or DCI scheduling a PUCCH.

The PUCCH may carry HARQ-ACK information of multiple PDSCHs, so the last symbol in symbols occupied by all DCI among DCI scheduling these related PDSCHs and DCI scheduling one or more PUSCHs, is needed. Similarly, for a plurality of a PUSCHs overlapped with the PUCCH, it is necessary to decide whether there is at least one PUSCH which can meet the requirement that the time interval from the earliest transmitted symbol of the PUSCH for the PUSCH to the last symbol of the latest DCI is greater than the second numerical value.

Similarly, for the timing requirement E, the last symbol of a PDSCH can be replaced by the last symbol scheduled to the latest DCI (i.e., DCI scheduling a PUSCH or DCI scheduling a PUCCH), and the second numerical value can be set to N. That is, the first symbol of PUSCH2 in FIG. 12 satisfies the condition that the interval to the last symbol of the latest DCI is larger than the second numerical value. As shown in FIG. 12, the timing requirement D can be met, and UCI is multiplexed in a PUSCH.

Timing requirement E does not require the first PUSCH overlapped with the PUCCH to meet the timing requirement, so UCI can be multiplexed in a PUSCH as much as possible to reduce unnecessary dropping. In addition, the timing requirement E can ensure that the PUSCH multiplexed with UCI knows that it needs to multiplex UCI before coding, which is suitable for the coding process of UE.

In one embodiment of requirment F, in a PUCCH and PUSCH(s) overlapping in time domain, the time interval from the earliest transmitted symbol of the PUSCH in one or more time units occupied by the PUSCH for the PUSCH to the last symbol of the latest DCI is greater than a second numerical value, where the DCI is DCI scheduling a PUSCH or DCI scheduling a PUCCH.

In this way, it is required that the time interval from the earliest transmitted PUSCH symbol of the first PUSCH among one or more PUSCHs overlapped with the PUCCH to the last symbol of the latest DCI is greater than the second numerical value. The advantage of this method is that UCI which meets the timing condition can be transmitted as soon as possible, and it can be ensured that the PUSCH multiplexed with UCI knows that it needs to multiplex UCI before coding. The rate matching UCI coding and mapping scheme is more suitable for timing requirement E.

In the above timing condition(s), the first numerical value may be a numerical value related to the shortest time for the UE to process a PDSCH, which may be defined in the protocol or configured by a base station. The second numerical value is a numerical value related to the shortest time for UE to prepare a PUSCH, which can be defined in the protocol or configured by a base station. Wherein, the above PUSCH is a repetition, which in particular can be an actual repetition or a nominal repetition. In addition, there may be different timing requirements for different UCI coding and mapping schemes. For example, for the puncturing coding and mapping scheme, PDSCH decoding needs to be completed before PUSCH transmission. Then timing requirement B or C or E or F is more reasonable. For the rate matching coding and mapping scheme, PDSCH decoding only needs to be completed before UCI transmission. Then timing requirement A is more reasonable.

In addition, for the case where UCI and a PUSCH cannot be multiplexed, part of a PUSCH can be dropped. For example, dropping all or part of PUSCH transmission on time units overlapped with the physical uplink control channel PUCCH transmitting UCI, or dropping PUSCH transmission on all time units overlapped with the PUCCH transmitting UCI. Wherein, all PUSCH transmission on time unit overlapped with the PUCCH can be dropped, or only symbols overlapped with the PUCCH can be dropped. Particularly, for the case where one PUSCH is repeated on multiple time units, dropping can be performed with a unit of time unit, that is, dropping the time unit occupied by the part of the PUSCH overlapped with the PUSCH, while the non-overlapping part is normally transmitted. Wherein, a time unit can be defined or configured as one or more slots, one or more symbols, a nominal repetition block, or an actual repetition. In addition, the number of symbols in multiple time units occupied by one TB may be the same or different. For example, the number of symbols in multiple actual repetitions occupied by one TB may be different. Particularly, the division of one time unit is not configured by a base station, but is performed by the UE according to predefined rules.

For example, one time unit may be one or more consecutive symbols for one PUSCH/PUCCH transmission. Or further, one time unit may be one or more consecutive symbols in one slot. Particularly, for the case where one PUSCH occupies one or more slots, one PUSCH transmission can be divided into several time units according to the number of symbols continuously transmitted and/or slot boundaries. Particularly, a time unit can be a time unit for calculating the TB or a time unit for determining the position of DMRS. This method can avoid dropping too many PUSCH transmission as much as possible. Because the code rate of a PUSCH occupying multiple time units is usually low, it can still be decoded after dropping some symbols or some time units.

In addition, condition(s) for dropping part of transmission of a PUSCH can be defined or configured. For example, DMRS needed for demodulation is needed in the PUSCH of the actual transmission after dropping part of the transmission. Alternatively, the dropped part does not include DMRS. Alternatively, partial dropping of a PUSCH transmission can be performed only when there is a complete transmission of an additional PUSCH carrying the same TB. In this way, it can be ensured that the TB can be decoded, and its performance is better than that of dropping a complete transmission of a PUSCH.

In another method, if a PUCCH and a PUSCH overlap in time domain, the transmission of the PUSCH or the PUCCH can be delayed with a unit of time unit or symbols. The method can improve better decoding performance of a PUSCH or a PUCCH.

It can be decided which to be dropped or delayed according to the priority of a PUSCH and a PUCCH. For example, drop or delay channels with lower priority. Its priority can be obtained through base station indication or by a predefined method. For example, when there is no priority indication, the priority of the PUCCH is higher than the PUSCH. Or the priority of HARQ-ACK is higher than the PUSCH.

Since one TB is transmitted in one PUSCH occupying multiple time units, that is, UE needs to determine how to perform rate matching before this PUSCH transmission. Therefore, the above timing requirement A is not well applicable. However, timing requirement A or timing requirement C can be applicable to the transmission mode in which UCI is transmitted by way of puncturing out some resource elements REs in a PUSCH. Particularly, in NR system, UCI is transmitted in a PUSCH via puncturing for 1-bit or 2-bit HARQ-ACK information. Considering that one PUSCH occupies multiple time units for transmission, thereby a code rate of the transmssion is relatively low, so the threshold for UCI multiplexing in a PUSCH by puncturing can be increased. The threshold can be defined in the protocol in advance or configured by the base station to the UE, for example, the threshold is less than 4-bit HARQ-ACK information. Alternatively, all HARQ-ACK information can be multiplexed by puncturing. Similarly, channel state information CSI can also be transmitted by puncturing. Or when the number of bits of the channel state information is less than a threshold, it can be transmitted by puncturing. Alternatively, when all information bits in UCI are less than a threshold, transmission can be performed by puncturing.

Figure 13:
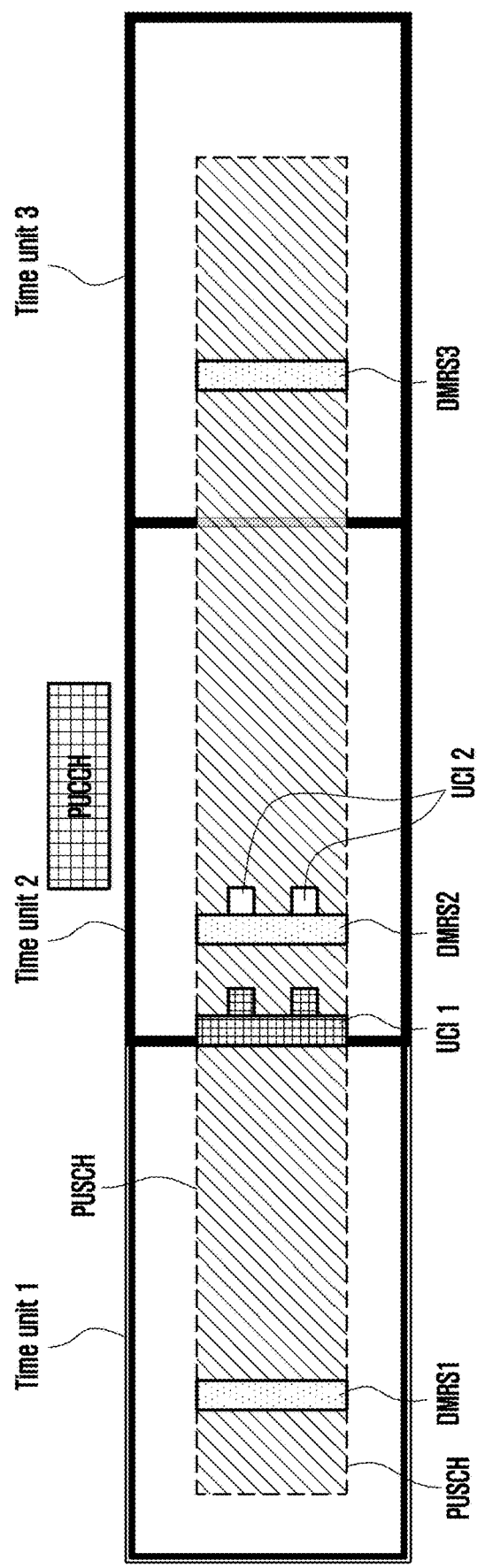
FIG. 13 illustrates a schematic diagram in which a PUCCH overlaps with one time unit occupied by one PUSCH transmission according to various embodiments of the present disclosure.
Figure 14:
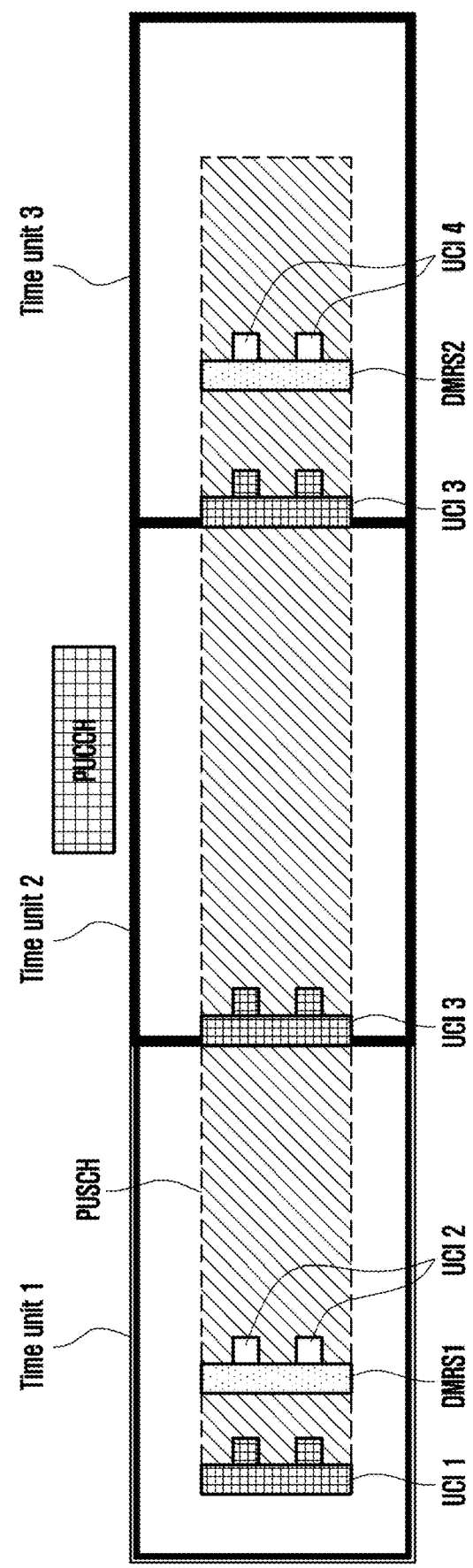
FIG. 14 illustrates another schematic diagram in which a PUCCH overlaps with one time unit occupied by one PUSCH according to various embodiments of the present disclosure.
Figure 15:
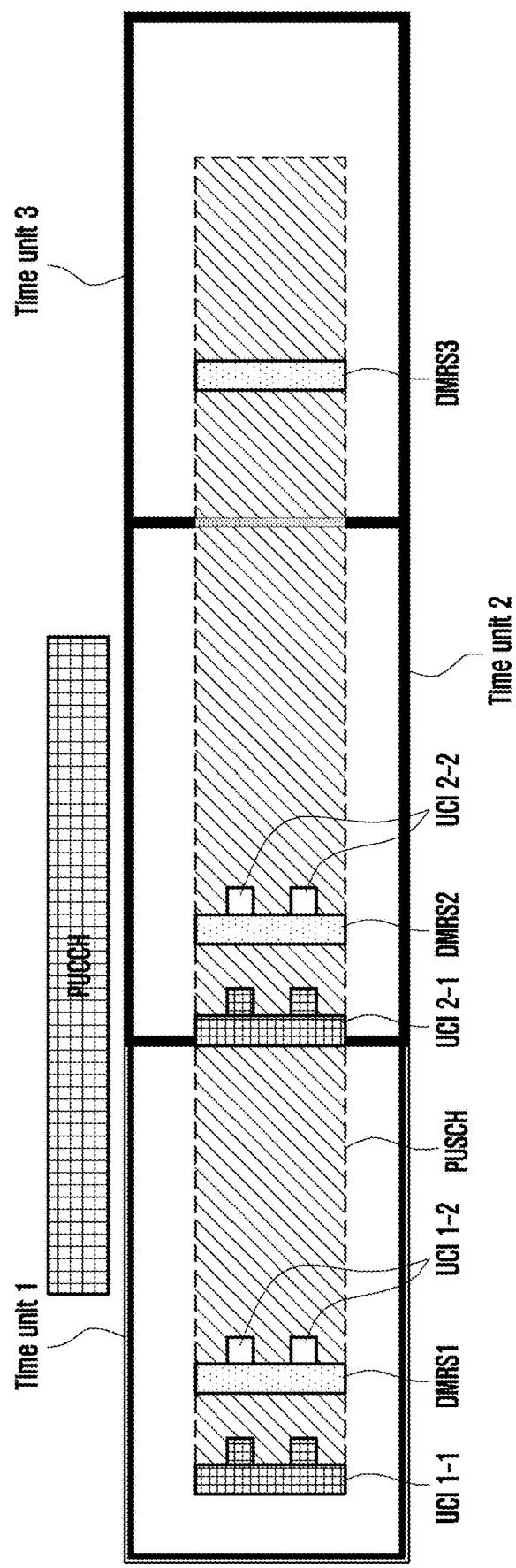
FIG. 15 illustrates a schematic diagram in which a PUCCH overlaps with multiple time units occupied by one PUSCH but there is no DMRS on the one time unit, according to various embodiments of the present disclosure.

With reference to FIGS. 13-15 and specific embodiments, the method for selecting the time unit position of the PUSCH multiplexed with UCI under the timing requirement(s) defined above will be described below.

If one PUCCH overlaps with multiple PUSCHs, wherein one PUSCH refers to one repetition, then in NR system, UCI is multiplexed on the first PUSCH in a slot if the PUCCH overlaps with multiple PUSCHs carrying different TBs. For Type B PUSCH repetition mode, one PUSCH refers to one actual repetition.

For carrier aggregation (CA) scenario, the subcarrier spacing (SCS) of the carrier where PUCCH is located may be different from that of a PUSCH. When the subcarrier of the PUCCH is smaller than that of the PUSCH, one PUCCH corresponding to multiple slots transmitting PUSCHs may occur. It may result in that, one PUCCH overlaps with the repetitions (in different slots) of multiple PUSCHs of one TB. At this time, UCI may be multiplexed on each PUSCH repetition. However, for Type B PUSCH, because repetitions of each PUSCH may have different number of symbols, in order to simplify the receiving complexity of the base station, it is only repeated on the first overlapped PUSCH (if the predefined timing requirement is met).

In NR, HARQ-ACK information may be mapped from the first symbol after the first DMRS of a PUSCH. For the case of frequency hopping in a PUSCH slot, HARQ-ACK information is mapped on each Hop.

The case where one repetition of one PUSCH occupies multiple time units may be described with regard to the following different situations. Wherein, one PUSCH can be one repetition of one TB, or all repetitions carrying the same TB:

In one embodiment of a), a PUCCH overlaps with one time unit occupied by one PUSCH transmission, wherein the PUSCH occupies one or more time units.

At this time, the PUCCH can be multiplexed on resources of time unit overlapped with the PUSCH. In addition, multiplexing (such as HARQ-ACK and/or other UCI information) may be started at the first symbol after the first DMRS in this time unit, or multiplexing may be performed at the first symbol transmitting the PUSCH or the first symbol not including DMRS in this time unit. Wherein, the multiplexing on position of PUSCH resources can be determined according to UCI information Type and/or the number of information bits and/or UCI coding and mapping scheme (such as puncturing or rate matching mapping scheme, etc.). In this way, UCI can be transmitted as close as possible to the originally scheduled time, avoiding requiring UE to prepare for UCI multiplexing in advance.

FIG. 13 illustrates a schematic diagram in which a PUCCH overlaps with one time unit occupied by one PUSCH transmission according to various embodiments of the present disclosure. As shown in FIG. 13, in time unit 2, one PUCCH overlaps with one PUSCH, wherein the PUSCH occupies time unit 1 to time unit 3, 3 time units in total; while the PUCCH is only transmitted in one time unit. Therefore, UCI can be multiplexed on the overlapping time unit 2. In addition, the position of UCI information multiplexing is determined according to the DMRS position in the overlapping time unit 2. In order to ensure the performance of HARQ-ACK, HARQ-ACK is multiplexed near DMRS. For example, UCI 2 is multiplexed on the first symbol after DMRS2 of time unit 2. Alternatively, multiplexing may be started according to the first symbol occupied by the PUSCH in time unit 2. For example, UCI1 is multiplexed on the first symbol transmitting PUSCH in time unit 2. In order to ensure channel estimation, the multiplexing of UCI needs to avoid DMRS symbols. The multiplexing order of different UCI information can be determined according to the transmission content and predefined rules.

In addition, since one PUSCH may occupy multiple time units, and DMRS does not need to exist in each time unit, if a PUCCH and a PUSCH overlap in one or more time units, but there is no DMRS on the overlapping time unit, the resource location for PUCCH information mapping can be determined according to at least one of the following methods, which are also applicable to the situation where UCI overlaps with multiple time units transmitting the PUSCH.

Particularly, methods include at least one of the followings:

mapping starts at the first symbol position transmitting a PUSCH in the overlapped time unit between PUCCH and PUSCH. This method is irrelevant with the mapping scheme of whether DMRS exists on overlapping time unit or not, and is simple to implement;

mapping starts at the first symbol position transmitting a PUSCH in one or more time units occupied by the PUSCH overlapped with a PUCCH. This method is irreleavant with the mapping scheme of whether DMRS exists on overlapping time unit or not, and is simple to implement;

mapping starts at the symbol position after the first DMRS in one or more time units occupied by the PUSCH overlapped with a PUCCH. In this way, because the PUCCH is mapped near DMRS, better UCI decoding performance can be obtained;

mapping starts at the starting symbol and/or ending symbol position of a PUCCH in one or more time units occupied by the PUSCH overlapped with the PUCCH, or at the symbol position after the nearest DMRS in the overlapped time unit between PUCCH and PUSCH. In this way, better UCI decoding performance can be obtained, and at the same time, UCI can be transmitted at the initial scheduled position as much as possible to avoid introducing stricter multiplexing timing requirement(s);

mapping starts at the position of the first symbol occupied by a PUSCH in the first time unit after the overlapped time unit between PUCCH and PUSCH. This method has low requirement on multiplexing timing and can transmit the PUSCH as much as possible; and/or mapping starts at the position of the first symbol occupied by a PUSCH in the first time unit including DMRS after the time unit where a PUCCH overlaps the PUSCH. This method has low requirement on multiplexing timing, and can transmit the PUSCH as much as possible, and because UCI is close to DMRS transmission, it can provide better UCI decoding performance.

Wherein, the above position of the first symbol also includes a non-DMRS symbol position. Alternatively, starting mapping at the symbol position after DMRS can be replaced by starting mapping at the symbol position before DMRS, or starting mapping at the symbol position where DMRS is located. Different mapping methods can be configured or predefined for different UCI information. In addition, a base station may also configure one or more of the above methods to a UE as needed.

Alternatively, the starting symbol may be determined as the last symbol of a PUSCH in the overlapped time unit between PUCCH and PUSCH; or the last symbol of a PUSCH carrying UCI is determined as the starting symbol.

The above methods can be used to determine the ending symbol occupied by UCI multiplexing in a PUSCH.

After determining the starting symbol for UCI multiplexing, RE mapping can be performed according to the predefined mapping rules until the mapping of all occupied REs is completed.

FIG. 14 illustrates another schematic diagram in which a PUCCH overlaps with one time unit occupied by one PUSCH according to various embodiments of the present disclosure, wherein there is no DMRS on the one time unit occupied by the PUCCH and the PUSCH. As shown in FIG. 14, in time unit 2, one PUCCH overlaps with one PUSCH, wherein the PUSCH occupies time unit 1 to time unit 3, 3 time units in total, while the PUCCH is only transmitted in one time unit. In addition, the DMRS of the PUSCH is transmitted only in time unit 1 and time unit 3, that is, in time unit overlapped with the PUCCH, there is no DMRS transmission for the PUSCH. Therefore, the mapping can start at the first symbol position transmitting the PUSCH in the time unit 2 where the PUCCH overlaps with the PUSCH, such as the position for which UCI3 is mapped in FIG. 14.

Alternatively, the mapping may start at the first symbol position transmitting the PUSCH in time unit 1 to time unit 3 occupied by the PUSCH overlapped with the PUCCH, such as the position for which UCI1 is mapped in time unit 1 as shown in FIG. 14.

Alternatively, the mapping may start at the symbol position after the first DMRS1 in time unit 1 to time unit 3 occupied by the PUSCH overlapped with the PUCCH, such as the position for which UCI2 is mapped in FIG. 14.

Alternatively, the mapping may start at the symbol position after DMRS2, which is closest to the starting or ending position of the PUCCH, in time unit 1 to time unit 3 occupied by the PUSCH overlapped with the PUCCH. As shown in FIG. 14, the interval between DMRS2 and the ending position of the PUCCH is smaller than the interval between DMRS1 and the starting position of the PUCCH, so UCI4 is started to be mapped after DRMS2. Alternatively, DMRS2 is located closest to the overlapping time unit 2, so UCI4 is started to be mapped after DRMS2.

Alternatively, the mapping starts at the position of the first symbol occupied by the PUSCH in the first time unit (i.e., time unit 2) after the time unit 2 where the PUCCH overlaps with the PUSCH, such as the position for which UCI3 is mapped in FIG. 14.

And in another case:

b) a PUCCH overlaps with multiple time units occupied by one PUSCH, wherein at least one of the PUSCH occupies multiple time units. This case occurs in the case where the SCS of the PUCCH is smaller than that of the PUSCH, or one time unit of the PUSCH is smaller than one slot.

At this time, the PUCCH can be multiplexed in the first time unit of multiple time units overlapped with the PUSCH, this method occupies less PUSCH resources and can ensure PUSCH performance; alternatively, the PUCCH can be multiplexed in each time unit of multiple time units overlapped with the PUSCH, and this method can ensure the performance of PUCCH; alternatively, the PUCCH can be multiplexed in the first time unit that meets the timing condition(s) among multiple time units overlapped with the PUSCH, this method can reduce the dropping of the PUSCH and improve the performance of PUSCH.

In addition, multiplexing (such as HARQ-ACK and/or other UCI information) may be started at the first symbol after the first DMRS in time unit in which PUCCH is multiplexed, or multiplexing may be performed on the first symbol in which DMRS is not included among the symbols for transmitting overlapping PUSCH in this time unit. Wherein, the location of resources multiplexed in PUSCH can be determined according to UCI information Type and/or the number of information bits. Wherein, the way of multiplexing on the PUSCH can be realized by way of puncturing or rate matching.

FIG. 15 illustrates a schematic diagram in which a PUCCH overlaps with multiple time units occupied by one PUSCH but there is no DMRS on the one time unit, according to various embodiments of the present disclosure. As shown in FIG. 15, in time unit 1 and time unit 2, one PUCCH overlaps with one PUSCH, wherein the PUSCH occupies time unit 1 to time unit 3, 3 time units intotal. Therefore, UCI can be multiplexed in the first time unit 1 in the multiple time units 1-2 overlapped with the PUSCH; alternatively, UCI can be multiplexed in each of the multiple time units 1 and 2 overlapped with the PUSCH, that is, time unit 1 and time unit 2; and alternatively, UCI can be multiplexed in the first time unit that meets the timing condition(s) among time units 1 and 2 overlapped with the PUSCH, that is, time unit 2.

In addition, the position of UCI information multiplexing is determined according to the DMRS position and/or the starting symbol position of the PUSCH in time unit 1 and/or time unit 2 for UCI multiplexing determined by one of the above methods. To ensure the performance of HARQ-ACK, HARQ-ACK (such as UCI 1-2 or UCI 2-2 shown in FIG. 15) is multiplexed near DMRS1 and/or DMSR2. Alternatively, multiplexing may start according to the first symbol occupied by the PUSCH in time unit 1 and/or time unit 2. For example, UCI 1-1 is multiplexed on the first symbol transmitting the PUSCH that is not DMRS in time unit 1, and UCI 2-1 is multiplexed on the first symbol transmitting the PUSCH that is not DMRS in time unit 2.

For the case where PUCCH multiplexing is performed on multiple time units, it can be determined on which of the multiple time units the transmission is to be performed according to UCI information. For example, for HARQ-ACK, it is transmitted on the first time unit that satisfies the timing condition. In addition, the same information can be retransmitted in multiple time units to improve the reliability of UCI. Whether to transmit on multiple time units or how to transmit can be determined according to the configuration of a base station.

For the case where one PUCCH overlaps with multiple PUSCHs, it can be first determined which PUSCH among the multiple PUSCHs the PUCCH is to be multiplexed on. For example, multiplexed on the first one of multiple overlapping PUSCHs, or multiplexed on each of multiple overlapping PUSCHs. Wherein, the multiple PUSCH can be multiple repetitions of one TB or different TBs. The method for determining the multiplexing PUSCH may be different for the case with regard to overlapped with the same and different TBs.

In addition, the above PUCCH overlapped with the PUSCH may be one or more PUCCHs. And similarly, the above PUSCH overlapped with the PUCCH may be one or more PUSCHs.

For the rate matching or puncturing mapping scheme, different methods for determining mapping resources mentioned above can be adopted. For example, for the puncturing scheme, because the timing constraint is not strict, UCI to be mapped by puncturing scheme can be mapped near DMRS, for example, near the first DMRS that meets partial timing constraint (e.g., PDSCH decoding time constraint) in the PUSCH overlapped with the PUCCH.

However, for the rate matching mapping scheme, it is necessary to determine whether UCI is to be multiplexed on the PUSCH before preparing for the PUSCH, so it can be mapped on the first symbol of the PUSCH that meets the timing requirement.

Specifically, for UCI mapped by puncturing scheme, mapping can start after the first DMRS symbol meeting the timing requirement in the PUSCH overlapped with UCI. Alternatively, the mapping may start after the first DMRS symbol in the first time unit that meets the timing requirement in the PUSCH overlapped with UCI. And alternatively, the mapping can start from the first symbol that can be used for UCI transmission in the first time unit that meets the timing requirement in the PUSCH overlapped with UCI.

Then, according to at least one of the number of resource elements REs in one or more time units occupied by the PUSCH and the number of resource elements REs in time unit occupied by the PUSCH multiplexed with UCI, the number of resource elements REs occupied by UCI may be calculated for mapping UCI on resources of the PUSCH according to the starting postion described above and the calculated number of REs, and transmitting the PUSCH multiplexed with UCI.

In an NR, each part of UCI information is coded independently, and the number of REs needed is calculated according to the predetermined priority, respectively. To ensure the reliability of UCI transmission, different code rate compensation factors $\beta_{offset}$ are adopted for different UCI information. Wherein, the code rate compensation factor indicates to compensate based on the current PUSCH code rate. In addition, in order to reserve certain REs for PUSCH transmission, NR introduced a high-layer parameter $\alpha$ to limit the upper limit of the number of REs occupied by each UCI.

Particularly, for the number of REs occupied by HARQ-ACK, the calculation equation is:

$$Q'_{ACK} = \min\left\{ \begin{array}{l} \left\lceil \dfrac{(O_{ACK} + L_{ACK}) \cdot \beta_{offset}^{HARQ\text{-}ACK} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \\ \left\lceil \alpha \cdot \sum_{l=l_0}^{N_{symb,all}^{PUSCH}-1} M_{sc}^{UCI}(l) \right\rceil \end{array} \right\},$$ (Equation 1)

Where $O_{ACK}$ is the number of HARQ-ACK bits, $L_{ACK}$ is the length of CRC, $\beta_{offset}^{HARQ\text{-}ACK}$ is the compensation factor, $M_{SC}^{UCI}(l)$ is the number of subcarriers that can be used for UCI transmission on symbol l, $\sum_{l=0}^{N_{symb,all}^{PUSCH}-1} M_{sc}^{UCI}(l)$ is the number of REs that can be used to carry UCI on the PUSCH that multiplexes UCI, and $l_0$ is the index of the first OFDM symbol that do not include DMRS in PUSCH transmission; $\sum_{r=0}^{C_{UL\text{-}SCH}-1} K_r$ in the denominator is the TBS of uplink PUSCH.

For Type B repetition transmission, the number of subcarriers that can be used for UCI transmission in a PUSCH is calculated as the number of subcarriers in one nominal repetition as follows (Equation 2). In order that the number of REs may not exceed the number of REs in an actual repetition, an additional term $\sum_{l=0}^{N_{symb,actual}^{PUSCH}-1} M_{sc,actual}^{UCI}(l)$ is added in the above (Equation 1) to ensure that the calculated $q'_{ACK}$ may not exceed the number of REs in the actual PUSCH repetition multiplexed with UCI, where $N_{symb,actual}^{PUSCH}$ is the number of symbols in the actual repetition, $M_{sc,actual}^{UCI}(l)$ is the number of REs in symbol l which can be used for UCI transmission in the actual repetition.

$$Q'_{ACK} = \min\left\{ \begin{array}{l} \left\lceil \dfrac{(O_{ACK} + L_{ACK}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL\text{-}SCH}-1} K_r} \right\rceil, \\ \left\lceil \alpha \cdot \sum_{l=0}^{N_{symb,nominal}^{PUSCH}-1} M_{sc,nominal}^{UCI}(l) \right\rceil, \\ \sum_{l=0}^{N_{symb,actual}^{PUSCH}-1} M_{sc,actual}^{UCI}(l) \end{array} \right\}$$ (Equation 2)

The calculation for the number of REs for CSI can be similar, and the number of REs has been occupied by HARQ-ACK needs to be removed in the last term.

According to the present disclosure, for a scenario where one PUSCH occupies multiple time units, the number of REs occupied by UCI can be determined according to all symbols occupied by the PUSCH in multiple time units occupied by the PUSCH multiplexed with UCI. As shown in FIG. 12, the PUCCH is multiplexed in PUSCH 1, so the resources for multiplexing the PUCCH can be determined according to all the resources occupied by PUSCH1 in time unit 1 and time unit 2. This method can balance UCI and PUSCH performance well.

Furthermore, in order to make UCI transmission within one time unit, additional restrictions may be added so that the determined number of REs may not exceed the number of resources available for UCI transmission in the PUSCH within the time unit for UCI multiplexing. As shown in FIG. 12, when it is decided that the PUCCH is multiplexed in time unit 1 of PUSCH1, the number of REs occupied by UCI is less than or equal to the number of REs available for UCI transmission for PUSCH1 in time unit 1. In an example, the number of REs for HARQ-ACK transmission can be calculated by using the following (Equation 3):

$$Q'_{ACK} = \min \left\{ \begin{bmatrix} \dfrac{(O_{ACK} + L_{ACK}) \cdot \beta_{offset}^{PUSCH} \cdot}{\sum_{l=0}^{N_{symb}^{PUSCH}-1} M_{sc}^{UCI}(l)} \\ \sum_{r=0}^{C_{UL-SCH}-1} K_r \end{bmatrix}, \left[ \alpha \cdot \sum_{l=0}^{N_{symb}^{PUSCH}-1} M_{sc}^{UCI}(l) \right], \sum_{l=0}^{N_{symb,per\,slot}^{PUSCH}-1} M_{sc,per\,slot}^{UCI}(l) \right\}$$  (Equation 3)

where $\Sigma_{l=0}^{N_{symb}^{PUSCH}-1} M_{sc}^{UCI}(l)$ is the total number of resources occupied by one transmission of the PUSCH, $N_{symbol\,per\,slot}^{PUSCH}$ is the number of symbols occupied by the PUSCH in one time unit, and $M_{sc,per\,slot}^{UCI}(l)$ is the number of REs on the lth symbol of the PUSCH in this time unit. In order to ensure that the number of REs in this time unit is not exceeded, a limit to the total number of REs $\Sigma_{l=0}^{N_{symb,per\,slot}^{PUSCH}-1} M_{sc,per\,slot}^{UCI}(l)$ occupied by the PUSCH in this time unit is introduced. Alternatively, the last term can be replaced by the maximum number of REs that can be used for UCI transmission in one time unit, the number of REs used when calculating TBs, and the like. This method can avoid UCI transmission in multiple time units and ensure the existing implementation.

Figure 16:
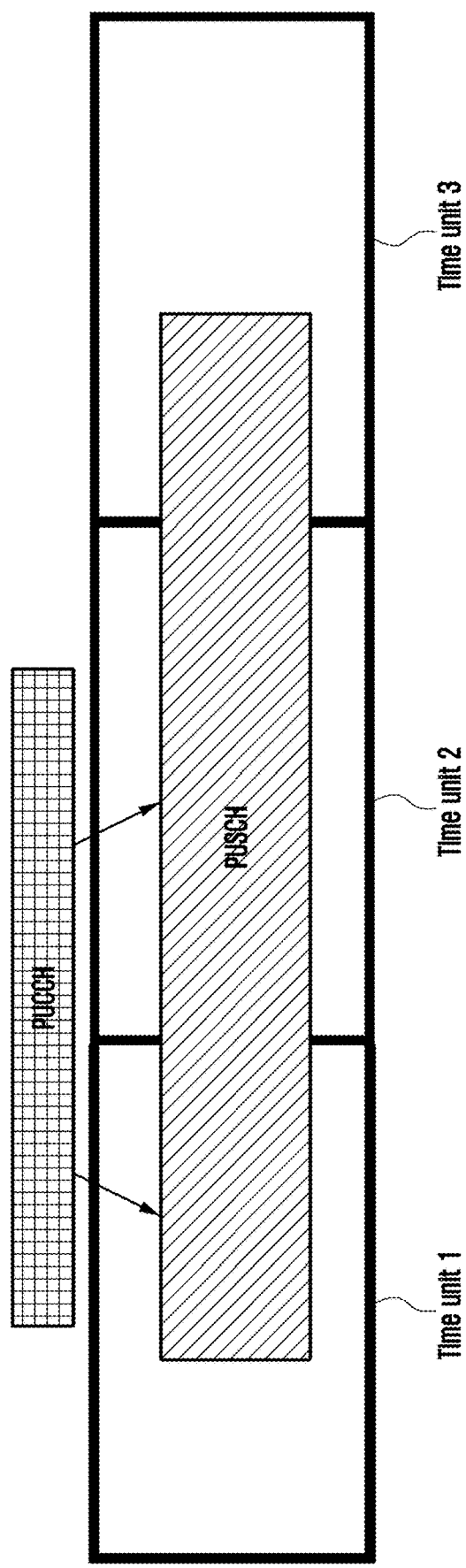
FIG. 16 illustrates another schematic diagram in which a PUCCH overlaps with multiple time units occupied by one PUSCH according to various embodiments of the present disclosure.

In another method, the number of REs occupied by UCI can be calculated according to all symbols occupied by the PUSCH in the time unit for UCI multiplexing among one or more time units occupied by the PUSCH. As shown in FIG. 16, PUSCH is transmitted in time unit 1 time unit 3, and it is determined that the PUCCH is on the PUSCH of time unit 1 and time unit 2, but may not be multiplexed on time unit 2. The number of REs for UCI transmission is determined according to the symbols transmitted on time unit 1 and time unit 2 for the PUSCH transmission.

There are two specific implementation methods:

(1) Method 1: the number of REs in the third term of Equation 3 is defined as the number of REs in all time units available for UCI multiplexing. For example, $N_{symbol\,per\,slot}^{PUSCH}$ can be defined as the number of symbols occupied by the PUSCH in all time units for UCI multiplexing; and (2) Method 2: $N_{symb,all}^{PUSCH}$ in Equation 1 represents the number of symbols occupied by a PUSCH in all time units available for UCI multiplexing determined by UE. Wherein, only some time units occupied by the PUSCH can be used for the multiplexing of UCI.

In addition, since the number of symbols used to calculate a TBS of the PUSCH may be different from the definition of a time unit occupied by the PUSCH, for example, the number of symbols used for calculating the TBS of the PUSCH is the number of symbols L indicated by the scheduled PUSCH, and the code rate of actual PUSCH transmission is obtained according to this number of symbols L, then the number of symbols occupied by UCI multiplexing can also be calculated according to the number of symbols used to calculate the TBS of the PUSCH.

For example, $N_{symb,all}^{PUSCH}$ in Equation 1 is defined as the number of symbols used to calculate the TBS of the PUSCH. Specifically, $N_{symb,all}^{PUSCH}$ may be the number of symbols L indicated by the scheduled PUSCH, or the product of the number of symbols L indicated by the scheduled PUSCH and the number of time unit spanned. Here, one time unit can be L symbols. Since the result of the first term in the Equation for calculating the number of REs represents the number of REs needed to transmit ($O_{ACK}+L_{ACK}$) information bits with the adjusted code rate, where $$\dfrac{\sum_{l=0}^{N_{symb,all}^{PUSCH}-1} M_{sc}^{UCI}(l)}{\sum_{r=0}^{C_{UL-SCH}-1} K_r}$$

represents the code rate of the PUSCH. If not all symbols of the PUSCH used for transmission are used in calculation, the above term needs to be adjusted so that it still represents the code rate of transmitting the PUSCH. For example, change the first term in Equation 1 to $$\left[ \dfrac{(O_{ACK} + L_{ACK}) \cdot \beta_{offset}^{HARQ-ACK} \cdot}{\rho_m \sum_{r=0}^{C_{UL-SCH}-1} K_r} \sum_{l=0}^{N_{symb,all}^{PUSCH}-1} M_{sc}^{UCI}(l) \right],$$

where $\rho_m$ is the conversion coefficient.

For example, $$\rho_m = \dfrac{m_0}{m} \text{ or } \rho_m = \dfrac{m}{m_0},$$

where m is the number of time unit occupied by the PUSCH, $m_0$ is the number of time unit used for multiplexing PUCCH or overlapping with the PUCCH. Similarly, m can be the number of symbols occupied by the PUSCH, or the number of REs, etc.; $m_0$ may be the number of symbols or REs used for multiplexing the PUCCH or overlapping with the PUCCH. In another example, the conversion may be performed according to the code rate indicated in the DCI. Or a base station can directly configure or fix a reference code rate or $\rho_m$. If both $\beta_{offset}^{HARQ-ACK}$ and $\rho_m$ can be configured by the base station, the base station can also configure the parameters $\beta_{offset}^{HARQ-ACK}$ and $\rho_m$ for different PUSCH types, respectively. For example, the base station respectively configures the parameter $\beta_{offset}^{HARQ-ACK}$ for the PUSCH occupying multiple time units and the PUSCH occupying only one time unit.

With respect to the higher layer parameter a configured for UE, it may be the same as the PUSCH which does not support occupying multiple time units, or the same or different parameter α' may be additionally configured. Or it can be converted according to at least one of the parameters for calculating a TBS, the number of time unit occupied by the PUSCH, and the number of time unit where the PUSCH overlaps with a PUCCH. For example, $\alpha'=\alpha/\rho_m$ or $\alpha'=\alpha\times\rho_m$, etc. Wherein, $\alpha$ is the parameter configured by a higher layer, $\alpha'$ is the parameter used when calculating the resources occupied by UCI. Or, similar to the acquisition method for $\rho_m$, $$\rho_m = \frac{m_0}{m} \text{ or } \rho_m = \frac{m}{m_0},$$

where m is the number of time unit occupied by the PUSCH, $m_0$ is the number of time unit used for multiplexing PUCCH or overlapping with the PUCCH. Or, $$\rho_m = \frac{m_0}{m},$$

where m is the number of symbols occupied by the PUSCH, or the number of REs, etc.; $m_0$ is the number of symbols or REs for multiplexing the PUCCH or overlapping with the PUCCH. Wherein, the same or different methods can be adopted when calculating $\alpha'$ and the conversion coefficient $\rho_m$ in Equation 1.

After determining the number of REs carrying HARQ-ACK, it is subtracted from the total number of REs carrying CSI, and then determine the number of REs carrying CSI according to one of the above methods. Alternatively, the total number of REs for carrying HARQ-ACK and CSI may be directly determined.

With reference to the drawings, the description set forth herein describes example configurations, methods and apparatus, and does not represent all examples that can be implemented or are within the scope of the claims. As used herein, the term "example" means "serving as an example, instance or illustration," rather than "preferred" or "superior to other examples." The detailed description includes specific details in order to provide an understanding of the described technology. However, these techniques may be practiced without these specific details. In some cases, well-known structures and devices are shown in block diagram form to avoid obscuring the concepts of the described examples.

Although this specification contains a plurality of specific implementation details, these should not be interpreted as limitations on the scope of any embodiment or claimed, but rather as descriptions of specific features of specific embodiments of the present disclosure. Certain features described in this specification in the context of separate embodiments may also be implemented in combination in a single embodiment. On the contrary, various features described in the context of a single embodiment can also be implemented separately in multiple embodiments or in any suitable subcombination. Furthermore, although features may be described above as functioning in certain combinations and even startingly claimed as such, in some cases, one or more features from a claimed combination may be deleted from the combination, and the claimed combination may be directed to subcombinations or variations of subcombinations.

It should be understood that the particular order or hierarchy of steps in the method of the present disclosure is illustrative of an exemplary process. Based on design preference, it can be understood that the specific order or level of steps in the method can be rearranged to achieve the functions and effects disclosed in the present disclosure. The appended method claims present the elements of the various steps in the order of example, and are not meant to be limited to the particular order or hierarchy presented unless specifically stated otherwise. Furthermore, although elements may be described or claimed in the singular form, the plural is also contemplated unless the limitation to the singular is explicitly stated. Therefore, the present disclosure is not limited to the illustrated example, and any means for performing the functions described herein are included in various aspects of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving, from a base station, a radio resource control (RRC) message including a list of time domain resource allocations (TDRAs), wherein at least one of the TDRAs includes a number of slots for physical uplink shared channel (PUSCH) transmissions and a number of repetitions of the PUSCH transmissions;
   receiving, from the base station, downlink control information (DCI) including a field indicating one TDRA of the list of TDRAs;
   identifying a number of resource elements (REs) for the PUSCH transmissions based on the number of slots indicated by the DCI;
   identifying a transport block size (TBS) for the PUSCH transmissions based on the identified number of REs; and
   performing the PUSCH transmissions based on the TBS over multiple slots corresponding to the number of slots indicated by the DCI,
   wherein a value multiplied by the number of slots and the number of repetitions of the PUSCH transmissions is not greater than a particular value.

2. The method of claim 1,
   wherein the number of slots is used to identify a number of symbols of hybrid automatic repeat request (HARQ) information for HARQ transmissions on a PUSCH.

3. The method of claim 1,
   wherein a phase continuity of the PUSCH transmissions is maintained, in case that an interval between the PUSCH transmissions is less than a predetermined value.

4. A method performed by a base station in a wireless communication system, the method comprising:
   transmitting, to a user equipment, UE, a radio resource control (RRC) message including a list of time domain resource allocations (TDRAs), wherein at least one of the TDRAs includes a number of slots for physical uplink shared channel (PUSCH) transmissions and a number of repetitions of the PUSCH transmissions;
   transmitting, to the UE, downlink control information (DCI) including a field indicating one TDRA of the list of TDRAs; and
   receiving, from the UE, PUSCHs over multiple slots corresponding to the number of slots indicated by the DCI,
   wherein a transport block size (TBS) for the PUSCH transmissions is identified based on a number of resource elements (REs),
   wherein the number of REs is identified based on the number of slots indicated by the DCI, and wherein a value multiplied by the number of slots and the number of repetitions of the PUSCH transmissions is not greater than a particular value.

5. The method of claim 4,
wherein, the number of slots is used to identify a number of hybrid automatic repeat request (HARQ) information for HARQ transmissions on a PUSCH.

6. The method of claim 4,
wherein a phase continuity of the PUSCH transmissions is maintained, in case that an interval between the PUSCH transmissions is less than a predetermined value.

7. A user equipment (UE) in a wireless communication system, the UE comprising:
a transceiver, and
a controller coupled with the transceiver and configured to:
receive, from a base station, a radio resource control (RRC) message including a list of time domain resource allocations (TDRAs), wherein at least one of the TDRAs includes a number of slots for physical uplink shared channel (PUSCH) transmissions and a number of repetitions of the PUSCH transmissions;
receive, from the base station, downlink control information (DCI) including a field indicating one TDRA of the list of TDRAs;
identify a number of resource elements (REs) for the PUSCH transmissions based on the number of slots indicated by the DCI;
identify a transport block size (TBS) for the PUSCH transmissions based on the identified number of REs; and
perform the PUSCH transmissions based on the TBS over multiple slots corresponding to the number of slots indicated by the DCI,
wherein a value multiplied by the number of slots and the number of repetitions of the PUSCH transmissions is not greater than a particular value.

8. The UE claim 7,
wherein the number of slots is used to identify a number of symbols of hybrid automatic repeat request (HARQ) information for HARQ transmissions on a PUSCH.

9. The UE of claim 7, wherein the controller is further configured to:
maintain a phase continuity of the PUSCH transmissions, in case that an interval between the PUSCH transmissions is less than a predetermined value.

10. A base station in a wireless communication system, the base station comprising:
a transceiver; and
a controller coupled with the transceive, and the transceiver configured to:
transmit, to a user equipment (UE), a radio resource control (RRC) message including a list of time domain resource allocations (TDRAs), wherein at least one of the TDRAs includes a number of slots for physical uplink shared channel (PUSCH) transmissions and a number of repetitions of the PUSCH transmissions,
transmit, to the UE, downlink control information (DCI) including a field indicating one TDRA of the list of TDRAs, and
receive, from the UE, PUSCHs over multiple slots corresponding to the number of slots indicated by the DCI,
wherein a transport block size (TBS) for the PUSCH transmissions is identified based on a number of resource elements (REs),
wherein, the number of REs is identified based on the number of slots indicated by the DCI, and
wherein a value multiplied by the number of slots and the number of repetitions of the PUSCH transmissions is not greater than a particular value.

11. The base station of claim 10,
wherein the number of slots is used to identify a number of symbols of hybrid automatic repeat request (HARQ) information for HARQ transmissions on a PUSCH.

12. The base station of claim 10,
wherein a phase continuity of the PUSCH transmissions is maintained, in case that an interval between the PUSCH transmissions is less than a predetermined value.

* * * * *